US012028701B2

(12) United States Patent
Davidson et al.

(10) Patent No.: US 12,028,701 B2
(45) **Date of Patent: *Jul. 2, 2024**

(54) METHODS AND SYSTEMS FOR DESIGNING AND APPLYING NUMERICALLY OPTIMIZED BINAURAL ROOM IMPULSE RESPONSES

(71) Applicant: Dolby Laboratories Licensing Corporation, San Francisco, CA (US)

(72) Inventors: Grant A. Davidson, Burlingame, CA (US); Kuan-Chieh Yen, Foster City, CA (US); Dirk Jeroen Breebaart, Ultimo (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,261

(22) Filed: Feb. 6, 2023

(65) Prior Publication Data

US 2023/0262409 A1 Aug. 17, 2023

Related U.S. Application Data

(63) Continuation of application No. 17/688,744, filed on Mar. 7, 2022, now Pat. No. 11,576,004, which is a (Continued)

(51) Int. Cl.
*H04S 7/00* (2006.01)

(52) U.S. Cl.
CPC .............. *H04S 7/304* (2013.01); *H04S 7/306* (2013.01); *H04S 2400/03* (2013.01); *H04S 2420/01* (2013.01); *H04S 2420/07* (2013.01)

(58) Field of Classification Search
CPC .. H04S 2420/01; H04S 2400/11; H04S 7/302; H04S 7/30
See application file for complete search history.

(56) References Cited

U.S. PATENT DOCUMENTS 5,717,767 A 2/1998 Inanaga
5,742,689 A 4/1998 Tucker
(Continued)

FOREIGN PATENT DOCUMENTS

EP 2357854 8/2011
EP 2503799 9/2012
(Continued)

OTHER PUBLICATIONS

Allen, J.B. et al."Image Method for Efficiently Simulating Small-Room Acoustics" J. Acoust. Soc. Am. 65, Apr. 1979, pp. 943-950.
(Continued)

*Primary Examiner* — Kile O Blair

(57) ABSTRACT

Methods and systems for designing binaural room impulse responses (BRIRs) for use in headphone virtualizers, and methods and systems for generating a binaural signal in response to a set of channels of a multi-channel audio signal, including by applying a BRIR to each channel of the set, thereby generating filtered signals, and combining the filtered signals to generate the binaural signal, where each BRIR has been designed in accordance with an embodiment of the design method. Other aspects are audio processing units configured to perform any embodiment of the inventive method. In accordance with some embodiments, BRIR design is formulated as a numerical optimization problem based on a simulation model (which generates candidate BRIRs) and at least one objective function (which evaluates each candidate BRIR), and includes identification of a best one of the candidate BRIRs as indicated by performance metrics determined for the candidate BRIRs by each objective function.

3 Claims, 6 Drawing Sheets

Related U.S. Application Data continuation of application No. 17/090,772, filed on Nov. 5, 2020, now Pat. No. 11,272,311, which is a continuation of application No. 16/749,494, filed on Jan. 22, 2020, now Pat. No. 10,834,519, which is a continuation of application No. 16/538,671, filed on Aug. 12, 2019, now Pat. No. 10,547,963, which is a continuation of application No. 15/109,557, filed as application No. PCT/US2014/072071 on Dec. 23, 2014, now Pat. No. 10,382,880.

(60) Provisional application No. 61/923,582, filed on Jan. 3, 2014.

(56) References Cited

U.S. PATENT DOCUMENTS

| | | | | |
|---|---|---|---|---|
| 5,987,142 | A * | 11/1999 | Courneau | H04S 3/004 381/310 |
| 6,639,989 | B1 * | 10/2003 | Zacharov | H04S 7/301 381/103 |
| 7,936,887 | B2 | 5/2011 | Smyth | |
| 8,045,718 | B2 | 10/2011 | Faure | |
| 8,175,286 | B2 | 5/2012 | Bech | |
| 8,265,284 | B2 | 9/2012 | Villemoes | |
| 8,270,616 | B2 | 9/2012 | Slamka | |
| 8,515,104 | B2 | 8/2013 | Dickins | |
| 9,215,544 | B2 * | 12/2015 | Faure | H04S 1/00 |
| 9,420,393 | B2 * | 8/2016 | Morrell | H04S 5/00 |
| 9,462,387 | B2 * | 10/2016 | Oomen | H04S 7/306 |
| 2005/0276430 | A1 | 12/2005 | He | |
| 2008/0008327 | A1 | 1/2008 | Ojala | |
| 2008/0031462 | A1 | 2/2008 | Walsh | |
| 2011/0135098 | A1 | 6/2011 | Kuhr | |
| 2012/0243713 | A1 | 9/2012 | Hess | |
| 2012/0328107 | A1 | 12/2012 | Nystrom et al. | |
| 2013/0272527 | A1 | 10/2013 | Oomen | |
| 2015/0350801 | A1 | 12/2015 | Koppens | |

FOREIGN PATENT DOCUMENTS

| | | |
|---|---|---|
| WO | 2013/064943 | 5/2013 |
| WO | 2013/111038 | 8/2013 |

OTHER PUBLICATIONS

Guo, Tian-Kui, "The Study on Simulating Binaural Room Impulse Response" IEEE International Conference on Computer Science and Information Technology, pp. 33-36, Jul. 9-11, 2010.

Hu, Hongmei, et al."Externalization of Headphone-Based Virtual Sound System" Journal of Southeast University, v. 38, No. 1, 1-5, Jan. 2008.

ITU-T Recommendation p. 862, "Wideband Extension to Recommendation for the Assessment of Wideband Telephone Networks and Speech Codecs", Nov. 2007, Perceptual Evaluation of Speech Quality.

Menzer, F. et al."Investigations on Modeling BRIR Tails with Filtered and Coherence-Matched Noise" AES Convention Paper 7852, presented at the 127th Convention, Oct. 9-12, 2009, New York, USA, pp. 1-9.

Menzer, Fritz "Binaural Audio Signal Processing Using Interaural Coherance Matching" Ecole Polytechnique Federal de Lausanne Thesis No. 4643, Apr. 2010.

Mickiewicz, W. et al."Headphone Processor Based on Individualized Head Related Transfer Functions Measured in Listening Room" AES Convention, May 1, 2004, pp. 1-6.

Rychtarikova, Monika "Perceptual Validation of Virtual Room Acoustics: Sound Localisation and Speech Understanding" Applied Acoustics, v. 72, n. 4, pp. 196-204, Mar. 2011.

Sabine, Wallace Clement, "Collected Papers on Acoustics" Harvard University Press, USA, 1922.

Werner, S. et al."Effects of Shaping of Binaural Room Impulse Responses on Localization" 5th International Workshop on Quality of Multimedia Experience, pp. 88-93, Jul. 2013.

* cited by examiner

METHODS AND SYSTEMS FOR DESIGNING AND APPLYING NUMERICALLY OPTIMIZED BINAURAL ROOM IMPULSE RESPONSES

CROSS-REFERENCE TO RELATED APPLICATIONS

This application is a continuation of U.S. patent application Ser. No. 17/688,744, filed Mar. 7, 2022, which is a continuation of U.S. patent application Ser. No. 17/090,772, filed 5 Nov. 2020, now U.S. Pat. No. 11,272,311 which is a continuation of U.S. patent application Ser. No. 16/749,494, filed Jan. 22, 2020, now U.S. Pat. No. 10,834,519, which is a continuation of U.S. patent application Ser. No. 16/538,671, filed Aug. 12, 2019, now U.S. Pat. No. 10,547,963, which is a continuation of U.S. patent application Ser. No. 15/109,557, filed Jul. 1, 2016, now U.S. Pat. No. 10,382,880, which is a U.S. National Stage of International Application No. PCT/US2014/072071, filed Dec. 23, 2014, which claims the benefit of priority to U.S. Provisional Patent Application No. 61/923,582 filed Jan. 3, 2014, each of which is hereby incorporated by reference in its entirety.

BACKGROUND OF THE INVENTION

1. Field of the Invention

The invention relates to methods (sometimes referred to as headphone virtualization methods) and systems for generating a binaural audio signal in response to a multi-channel audio input signal, by applying a binaural room impulse response (BRIR) to each channel of a set of channels (e.g., to all channels) of the input signal, and to methods and systems for designing BRIRs for use in such methods and systems.

2. Background of the Invention

Headphone virtualization (or binaural rendering) is a technology that aims to deliver a surround sound experience or immersive sound field using standard stereo headphones.

A method for generating a binaural signal in response to a multi-channel audio input signal (or in response to a set of channels of such a signal) is sometimes referred to herein as a "headphone virtualization" method, and a system configured to perform such a method is sometimes referred to herein as a "headphone virtualizer" (or "headphone virtualization system" or "binaural virtualizer").

Recently, the number of people enjoying music, movies, and games using headphones has grown dramatically. Portable devices offer a convenient and popular alternative to experiencing entertainment in cinema and home theaters, and headphones (including earbuds) are the primary listening means. Unfortunately, traditional headphone listening typically provides only a limited audio experience relative to that provided by other traditional presentation systems. The limitations can be attributed to significant acoustic path differences between naturally occurring soundfields and those produced by headphones. Audio content in the form of either original stereo material or multi-channel audio downmixes are perceived as significantly ellipsoidal in nature when presented in a traditional manner over headphones (the emitted sound is perceived as emitting from locations "in-the-head" and to the immediate left and right side of the ears). Most listeners have little if any sensation of front-back depth, let alone elevation. On the other hand, listening to a traditional presentation over loudspeakers is perceived in nearly all cases as "out-of-head" (well-externalized).

A primary goal of headphone virtualizers is to create a sense of natural space to stereo and multi-channel audio programs delivered by headphones. Ideally, soundfields produced over headphones are sufficiently realistic and convincing that headphone users will lose awareness that they are wearing headphones at all. The sense of space can be created by convolving appropriately-designed binaural room impulse responses (BRIRs) with each audio channel or object in the program. The processing can be applied either by the content creator or by a consumer playback device. The BRIR typically represents the impulse response of the electro-acoustic system from loudspeakers, in a given room, to the entrance of the ear canal.

Early headphone virtualizers applied a head-related transfer function (HRTF) to convey spatial information in binaural rendering. An HRTF is a direction- and distance-dependent filter pair that characterizes how sound transmits from a specific point in space (sound source location) to both ears of a listener in an anechoic environment. Essential spatial cues such as the interaural time difference (ITD), interaural level difference (ILD), head shadowing effect, and spectral peaks and notches due to shoulder and pinna reflections, can be perceived in the rendered HRTF-filtered binaural content. Due to the constraint of human head size, the HRTFs do not provide sufficient or robust cues regarding source distance beyond roughly one meter. As a result, virtualizers based solely on HRTFs usually do not achieve good externalization or perceived distance.

Most of the acoustic events in our daily life happen in reverberant environments where, in addition to the direct path (from source to ear) modeled by HRTFs, audio signals also reach a listener's ears through various reflection paths. Reflections introduce profound impact to auditory perception, such as distance, room size, and other attributes of the space. To convey this information in binaural rendering, a virtualizer needs to apply the room reverberation in addition to the cues in the direct path HRTF. A binaural room impulse response (BRIR) characterizes the transformation of audio signals from a specific point in space to the listener's ears in a specific acoustic environment. In theory, BRIRs derived from room response measurements include all acoustic cues regarding spatial perception.

FIG. 1 is block diagram of a system (20) including a headphone virtualization system of a type configured to apply a binaural room impulse response (BRIR) to each full frequency range channel ($X_1, \ldots, X_N$) of a multi-channel audio input signal. The headphone virtualization system (sometimes referred to as a virtualizer) can be configured to apply a conventionally determined binaural room impulse response, $BRIR_i$, to each channel $X_i$.

Each of channels $X_1, \ldots, X_N$, (which may be stationary speaker channels or moving object channels) corresponds to a specific source direction (azimuth and elevation) and distance relative to an assumed listener (i.e., the direction of a direct path from an assumed position of a corresponding speaker to the assumed listener position and the distance along the direct path between the assumed listener and speaker positions), and each such channel is convolved by the BRIR for the corresponding source direction and distance. Thus, subsystem 2 is configured to convolve channel $X_1$ with $BRIR_i$ (the BRIR for the corresponding source direction and distance), subsystem 4 is configured to convolve channel $X_N$ with $BRIR_N$ (the BRIR for the corresponding source direction), and so on. The output of each BRIR subsystem (each of subsystems 2, . . . , 4) is a time-domain binaural audio signal including a left channel and a right channel.

The multi-channel audio input signal may also include a low frequency effects (LFE) or subwoofer channel, identified in FIG. 1 as the "LFE" channel. In a conventional manner, the LFE channel is not convolved with a BRIR, but is instead attenuated in gain stage 5 of FIG. 1 (e.g., by −3 dB or more) and the output of gain stage 5 is mixed equally (by elements 6 and 8) into each of channel of the virtualizer's binaural output signal. An additional delay stage may be needed in the LFE path in order to time-align the output of stage 5 with the outputs of the BRIR subsystems (2, . . . , 4). Alternatively, the LFE channel may simply be ignored (i.e., not asserted to or processed by the virtualizer). Many consumer headphones are not capable of accurately reproducing an LFE channel.

The left channel outputs of the BRIR subsystems are mixed (with the output of stage 5) in addition element 6, and the right channel outputs of the BRIR subsystems are mixed (with the output of stage 5) in addition element 8. The output of element 6 is the left channel, L, of the binaural audio signal output from the virtualizer, and the output of element 8 is the right channel, R, of the binaural audio signal output from the virtualizer.

System 20 may be a decoder which is coupled to receive an encoded audio program, and which includes a subsystem (not shown in FIG. 1) coupled and configured to decode the program including by recovering the N full frequency range channels ($X_1$, . . . , $X_N$) and the LFE channel therefrom and to provide them to elements 2, . . . , 4, and 5 of the virtualizer (which comprises elements, 2, . . . , 4, 5, 6, and 8, coupled as shown). The decoder may include additional subsystems, some of which perform functions not related to the virtualization function performed by the virtualization system, and some of which may perform functions related to the virtualization function. For example, the latter functions may include extraction of metadata from the encoded program, and provision of the metadata to a virtualization control subsystem which employs the metadata to control elements of the virtualizer system.

In some conventional virtualizers, the input signal undergoes time domain-to-frequency domain transformation into the QMF (quadrature mirror filter) domain, to generate channels of QMF domain frequency components. These frequency components undergo filtering (e.g., in QMF-domain implementations of subsystems 2, . . . , 4 of FIG. 1) in the QMF domain and the resulting frequency components are typically then transformed back into the time domain (e.g., in a final stage of each of subsystems 2, . . . , 4 of FIG. 1) so that the virtualizer's audio output is a time-domain signal (e.g., time-domain binaural audio signal).

In general, each full frequency range channel of a multi-channel audio signal input to a headphone virtualizer is assumed to be indicative of audio content emitted from a sound source at a known location relative to the listener's ears. The headphone virtualizer is configured to apply a binaural room impulse response (BRIR) to each such channel of the input signal.

The BRIR can be separated into three overlapping regions. The first region, which the inventors refer to as the direct response, represents the impulse response form a point in anechoic space to the entrance of the ear canal. This response, typically of 5 ms duration or less, is more commonly referred to as the Head-Related Transfer Function (HRTF). The second region, referred to as early reflections, contains sound reflections from objects that are closest to the sound source and the listener (e.g. floor, room walls, furniture). The last region, called the late response, is comprised of a mixture of higher-order reflections with different intensities and from a variety of directions. This region is often described by stochastic parameters such as the peak density, modal density, and energy-decay time (T60) due to its complex structures.

Early reflections are usually primary or secondary reflections and have relatively sparse temporal distribution. The micro structure (e.g., ITD and ILD) of each primary or secondary reflection is important. For later reflections (sound reflected from more than two surfaces before being incident at the listener), the echo density increases with increasing number of reflections, and the micro attributes of individual reflections become hard to observe. For increasingly later reflections, the macro structure (e.g., the reverberation decay rate, interaural coherence, and spectral distribution of the overall reverberation) becomes more important.

The human auditory system has evolved to respond to perceptual cues conveyed in all three regions. The first region (direct response) mostly determines the perceived direction of a sound source. This phenomenon is referred to as the law of the first wavefront. The second region (early reflections) has a modest effect on the perceived direction of a source, but a stronger influence on the perceived timbre and distance of the source. The third region (late response) influences the perceived environment in which the source is located. For this reason, careful study is required of the effects of all three regions on BRIR performance to achieve an optimal virtualizer design.

One approach to BRIR design is to derive all or part of each BRIR to be applied by a virtualizer from either physical room and head measurements or room and head model simulations. Typically a room or room model having very desirable acoustical properties is selected, with the aim that the headphone virtualizer replicate the compelling listening experience of the actual room. Under the assumption that the room model accurately embodies acoustical characteristics of the selected listening room, this approach produces virtualizer BRIRs that inherently apply the auditory cues essential to spatial audio perception. Such cues that are well-known in the art include interaural time difference, interaural level difference, interaural coherence, reverberation time (T60 as a function of frequency), direct-to-reverberant ratio, specific spectral peaks and notches and echo density. Under ideal BRIR measurement and headphone listening conditions, binaural renderings of multi-channel audio files based on physical room BRIRs can sound virtually indistinguishable from loudspeaker presentation in the same room.

However, a drawback of conventional methods for BRIR design is that binaural renders produced using conventionally designed BRIRs (which have been designed to match actual room BRIRs) can sound colored, muddy, and not well-externalized when auditioned in inconsistent listening environments (environments that are inconsistent with the measurement room). The root causes of this phenomenon are still an ongoing area of research and involve both aural and visual sensory input. However, what is evident is that BRIRs designed to match physical room BRIRs can modify the signal to be rendered in both desirable and undesirable ways. Even top-quality listening rooms impart spectral coloration and time-smearing to the rendered output signal. As one example, acoustic reflections from some listening rooms are lowpass in nature. This leads to low-frequency spectral notches in the rendered output signal (spectral combing). Although low-frequency spectral notches are known to aid humans in sound source localization, in headphone listening scenarios they are generally undesirable due to added spectral coloration. In an actual listening scenario using loudspeakers positioned away from the listener, the human auditory/cognition system is able to adapt to its environment so that these impairments can go unnoticed. However, when a listener receives the same acoustic signals presented over headphones in an inconsistent listening environment, such impairments become more apparent and reduce naturalness relative to a conventional stereo program.

Other considerations in BRIR design include any applicable constraints on BRIR size and length. The effective length of a typical BRIR extends to hundreds of milliseconds or longer in most acoustic environments. Direct application of BRIRs may require convolution with a filter of thousands of taps, which is computationally expensive. Without parameterization, a large memory space may be needed to store BRIRs for different source positions in order to achieve sufficient spatial resolution.

A filter having the well-known filter structure known as a feedback delay network (FDN) can be used to implement a spatial reverberator which is configured to apply simulated reverberation (i.e., a late response portion of a BRIR) to each channel of a multi-channel audio input signal, or to apply an entire (early and late portion of a) BRIR to each such channel. The structure of an FDN is simple. It comprises several branches (sometimes referred to as reverb tanks). Each reverb tank (e.g., the reverb tank comprising gain element $g_1$ and delay line $z^{-n1}$, in the FDN of FIG. 3) has a delay and gain. In a typical implementation of an FDN, the outputs from all the reverb tanks are mixed by a unitary feedback matrix and the outputs of the matrix are fed back to and summed with the inputs to the reverb tanks. Gain adjustments may be made to the reverb tank outputs, and the reverb tank outputs (or gain adjusted versions of them) can be suitably remixed for binaural playback. Natural sounding reverberation can be generated and applied by an FDN with compact computational and memory footprints. FDNs have therefore been used in virtualizers, to apply a BRIR or to supplement the direct response applied by an HRTF.

An example of a BRIR system (e.g., an implementation of one of subsystems 2, . . . , 4 of the virtualizer of FIG. 1) which employs feedback delay networks (FDNs) to apply a BRIR to an input signal channel will be described with reference to FIG. 2. The BRIR system of FIG. 2 includes analysis filterbank 202, a bank of FDNs (FDNs 203, 204, . . . , and 205), and synthesis filterbank 207, coupled as shown. Analysis filterbank 202 is configured to apply a transform to the input channel $X_i$ to split its audio content into "K" frequency bands, where K is an integer. The filterbank domain values (output from filterbank 202) in each different frequency band are asserted to a different one of the FDNs 203, 204, . . . , 205 (there are "K" of these FDNs), which are coupled and configured to apply the BRIR to the filterbank domain values asserted thereto.

In a variation on the system shown in FIG. 2, each of FDNs 203, 204, . . . , 205 is coupled and configured to apply a late reverberation portion (or early reflection and late reverberation portions) of a BRIR to the filterbank domain values asserted thereto, and another subsystem (not shown in FIG. 2) applies the direct response and early reflection portions (or the direct response portion) of the BRIR to the input channel $X_i$.

With reference again to FIG. 2, each of the FDNs 203, 204, . . . , and 205, is implemented in the filterbank domain, and is coupled and configured to process a different frequency band of the values output from analysis filterbank 202, to generate left and right channel filtered signals for each band. For each band, the left filtered signal is a sequence of filterbank domain values, and right filtered signal is another sequence of filterbank domain values. Synthesis filterbank 207 is coupled and configured to apply a frequency domain-to-time domain transform to the 2K sequences of filterbank domain values (e.g., QMF domain frequency components) output from the FDNs, and to assemble the transformed values into a left channel time domain signal (indicative of left channel audio to which the BRIR has been applied) and a right channel time domain signal (indicative of right channel audio to which the BRIR has been applied).

In a typical implementation each of the FDNs 203, 204, . . . , and 205, is implemented in the QMF domain, and filterbank 202 transforms the input channel 201 into the QMF domain (e.g., the hybrid complex quadrature mirror filter (HCQMF) domain), so that the signal asserted from filterbank 202 to an input of each of FDNs 203, 204, . . . , and 205 is a sequence of QMF domain frequency components. In such an implementation, the signal asserted from filterbank 202 to FDN 203 is a sequence of QMF domain frequency components in a first frequency band, the signal asserted from filterbank 202 to FDN 204 is a sequence of QMF domain frequency components in a second frequency band, and the signal asserted from filterbank 202 to FDN 205 is a sequence of QMF domain frequency components in a "K"th frequency band. When analysis filterbank 202 is so implemented, synthesis filterbank 207 is configured to apply a QMF domain-to-time domain transform to the 2K sequences of output QMF domain frequency components from the FDNs, to generate the left channel and right channel late-reverbed time-domain signals which are output to element 210.

The feedback delay network of FIG. 3 is an exemplary implementation of FDN 203 (or 204 or 205) of FIG. 2. Although the FIG. 3 system has four reverb tanks (each including a gain stage, $g_i$, and a delay line, $z^{-n1}$, coupled to the output of the gain stage) variations thereon the system (and other FDNs employed in embodiments of the inventive virtualizer) implement more than or less than four reverb tanks.

The FDN of FIG. 3 includes input gain element 300, all-pass filter (APF) 301 coupled to the output of element 300, addition elements 302, 303, 304, and 305 coupled to the output of APF 301, and four reverb tanks (each comprising a gain element, $g_k$ (one of elements 306), a delay line, $z^{-Mk}$ (one of elements 307) coupled thereto, and a gain element, $1/g_k$ (one of elements 309) coupled thereto, where $0 \leq k-1 \leq 3$) each coupled to the output of a different one of elements 302, 303, 304, and 305. Unitary matrix 308 is coupled to the outputs of the delay lines 307, and is configured to assert a feedback output to a second input of each of elements 302, 303, 304, and 305. The outputs of two of gain elements 309 (of the first and second reverb tanks) are asserted to inputs of addition element 310, and the output of element 310 is asserted to one input of output mixing matrix 312. The outputs of the other two of gain elements 309 (of the third and fourth reverb tanks) are asserted to inputs of addition element 311, and the output of element 311 is asserted to the other input of output mixing matrix 312.

Element 302 is configured to add the output of matrix 308 which corresponds to delay line $z^{-n1}$ (i.e., to apply feedback from the output of delay line $z^{-n1}$ via matrix 308) to the input of the first reverb tank. Element 303 is configured to add the output of matrix 308 which corresponds to delay line $z^{-n2}$ (i.e., to apply feedback from the output of delay line $z^{-n2}$ via matrix 308) to the input of the second reverb tank. Element 304 is configured to add the output of matrix 308 which corresponds to delay line $z^{-n3}$ (i.e., to apply feedback from the output of delay line $z^{-n3}$ via matrix 308) to the input of the third reverb tank. Element 305 is configured to add the output of matrix 308 which corresponds to delay line $z^{-n4}$ (i.e., to apply feedback from the output of delay line $z^{-n4}$ via matrix 308) to the input of the fourth reverb tank.

Input gain element 300 of the FDN of FIG. 3 is coupled to receive one frequency band of the transformed signal (a filterbank domain signal) which is output from analysis filterbank 202 of FIG. 3. Input gain element 300 applies a gain (scaling) factor, $G_{in}$, to the filterbank domain signal asserted thereto. Collectively, the scaling factors $G_{in}$ (implemented by all the FDNs 203, 204, . . . , 205 of FIG. 3) for all the frequency bands control the spectral shaping and level.

In a typical QMF-domain implementation of the FDN of FIG. 3, the signal asserted from the output of all-pass filter (APF) 301 to the inputs of the reverb tanks is a sequence of QMF domain frequency components. To generate more natural sounding FDN output, APF 301 is applied to output of gain element 300 to introduce phase diversity and increased echo density. Alternatively, or additionally, one or more all-pass delay filters may be applied in the reverb tank feed-forward or feed-back paths depicted in FIG. 3 (e.g., in addition or replacement of delay lines $z^{-M_k}$ in each reverb tank; or the outputs of the FDN (i.e., to the outputs of output matrix 312).

In implementing the reverb tank delays, $z^{-ni}$, the reverb delays $n_i$ should be mutually prime numbers to avoid the reverb modes aligning at the same frequency. The sum of the delays should be large enough to provide sufficient modal density in order to avoid artificial sounding output. But the shortest delays should be short enough to avoid excess time gap between the late reverberation and the other components of the BRIR.

Typically, the reverb tank outputs are initially panned to either the left or the right binaural channel. Normally, the sets of reverb tank outputs being panned to the two binaural channels are equal in number and mutually exclusive. It is also desired to balance the timing of the two binaural channels. So if the reverb tank output with the shortest delay goes to one binaural channel, the one with the second shortest delay would go the other channel.

The reverb tank delays can be different across frequency bands so as to change the modal density as a function of frequency. Generally, lower frequency bands require higher modal density, thus the longer reverb tank delays.

The amplitudes of the reverb tank gains, $g_i$, and the reverb tank delays jointly determine the reverb decay time of the FDN of FIG. 3:

$$T_{60}=-3n_i/\log_{10}(|g_i|)/F_{FRM}$$

where $F_{FRM}$ is the frame rate of filterbank 202 (of FIG. 3). The phases of the reverb tank gains introduce fractional delays to overcome the issues related to reverb tank delays being quantized to the downsample-factor grid of the filterbank.

The unitary feedback matrix 308 provides even mixing among the reverb tanks in the feedback path.

To equalize the levels of the reverb tank outputs, gain elements 309 apply a normalization gain, $1/|g_i|$ to the output of each reverb tank, to remove the level impact of the reverb tank gains while preserving fractional delays introduced by their phases.

Output mixing matrix 312 (also identified as matrix $M_{out}$) is a 2×2 matrix configured to mix the unmixed binaural channels (the outputs of elements 310 and 311, respectively) from initial panning to achieve output left and right binaural channels (the L and R signals asserted at the output of matrix 312) having desired interaural coherence. The unmixed binaural channels are close to being uncorrelated after the initial panning because they do not consist of any common reverb tank output. If the desired interaural coherence is Coh, where $|Coh|\leq 1$, output mixing matrix 312 may be defined as:

$$M_{out}=\begin{bmatrix}\cos\beta & \sin\beta\\ \sin\beta & \cos\beta\end{bmatrix}, \text{ where } \beta=\arcsin(Coh)/2$$

Because the reverb tank delays are different, one of the unmixed binaural channels would lead the other constantly. If the combination of reverb tank delays and panning pattern is identical across frequency bands, sound image bias would result. This bias can be mitigated if the panning pattern is alternated across the frequency bands such that the mixed binaural channels lead and trail each other in alternating frequency bands. This can be achieved by implementing the output mixing matrix 312 so as to have form as set forth in the previous paragraph in odd-numbered frequency bands (i.e., in the first frequency band (processed by FDN 203 of FIG. 3), the third frequency band, and so on), and to have the following form in even-numbered frequency bands (i.e., in the second frequency band (processed by FDN 204 of FIG. 3), the fourth frequency band, and so on):

$$M_{out,alt}=\begin{bmatrix}\sin\beta & \cos\beta\\ \cos\beta & \sin\beta\end{bmatrix}$$

where the definition of β remains the same. It should be noted that matrix 312 can be implemented to be identical in the FDNs for all frequency bands, but the channel order of its inputs may be switched for alternating ones of the frequency bands (e.g., the output of element 310 may be asserted to the first input of matrix 312 and the output of element 311 may be asserted to the second input of matrix 312 in odd frequency bands, and the output of element 311 may be asserted to the first input of matrix 312 and the output of element 310 may be asserted to the second input of matrix 312 in even frequency bands.

In the case that frequency bands are (partially) overlapping, the width of the frequency range over which matrix 312's form is alternated can be increased (e.g., it could alternated once for every two or three consecutive bands), or the value of β in the above expressions (for the form of matrix 312) can be adjusted to ensure that the average coherence equals the desired value to compensate for spectral overlap of consecutive frequency bands.

The inventors have recognized that it would be desirable to design BRIRs that apply (to the input signal channels) the least processing necessary to achieve natural-sounding and well-externalized audio over headphones. In typical embodiments of the present invention, this is accomplished by designing BRIRs that assimilate binaural cues that are not only important to spatial perception but also maintain naturalness of the rendered signal. Binaural cues that improve spatial perception but only at the cost of audio distortion are avoided. Many of the cues that are avoided are a direct result of acoustical effects that our physical surroundings have on the sound received by our ears. Accordingly, typical embodiments of the inventive BRIR design method incorporate room features that result in virtualizer performance gains and avoid those that cause unacceptable quality impairments. In short, rather than design a virtualizer BRIR from a room, typical embodiments design a perceptually-optimized BRIR that in turn defines a minimalistic virtual room. The virtual room selectively incorporates acoustical properties of physical spaces, but is not bound by constraints of actual rooms.

BRIEF DESCRIPTION OF THE INVENTION

In a class of embodiments, the invention is a method for designing binaural room impulse responses (BRIRs) for use in headphone virtualizers. In accordance with the method, BRIR design is formulated as a numerical optimization problem based on a simulation model (which generates candidate BRIRs, preferably in accordance with perceptual cues and perceptually-beneficial acoustic constraints) and at least one objective function (which evaluates each of the candidate BRIRs, preferably in accordance with perceptual criteria), and includes a step of identifying a best (e.g., optimal) one of the candidate BRIRs (as indicated by performance metrics determined for the candidate BRIRs by each objective function). Typically, each BRIR designed in accordance with the method (i.e., each candidate BRIR determined to be a best one of a number of candidate BRIRs) is useful for virtualization of speaker channels and/or object channels of multi-channel audio signals. Typically, the method includes a step of generating at least one signal indicative of each designed BRIR (e.g., a signal indicative of data indicative of each designed BRIR), and optionally also a step of delivering at least one said signal to a headphone virtualizer, or configuring a headphone virtualizer to apply at least one designed BRIR.

In typical embodiments, the simulation model is a stochastic room/head model. During numerical optimization (to select a best one of a set of candidate BRIRs), the stochastic model generates each of the candidate BRIRs such that each candidate BRIR (when applied to input audio to generate filtered audio intended to be perceived as emitting from a source having predetermined direction and distance relative to an intended listener) inherently applies auditory cues essential to the intended spatial audio perception ("spatial audio perceptual cues") while minimizing room effects that cause coloration and time-smearing artifacts. Typically, the degree of similarity between each candidate BRIR and a predetermined "target" BRIR is numerically evaluated in accordance with each objective function. Alternatively, each candidate BRIR is otherwise evaluated in accordance with each objective function (e.g., to determine a degree of similarity between at least one property of the candidate BRIR to at least one target property). In some cases, the candidate BRIR which is identified as a "best" candidate BRIR represents a response of a virtual room which is not easily physically realizable (e.g., a minimalistic virtual room which is not physically realizable or not easily physically realizable), yet which can be applied to generate a binaural audio signal which conveys the auditory cues necessary for delivering natural-sounding and well-externalized multi-channel audio over headphones.

In a real (physical) room, the early reflections and late reverberation follow from geometry and physics laws. For example, the early reflections resulting from a room are dependent on the geometry of the room, the position of the source, and the position of the listener (the two ears). A common method to determine the level, delay and direction of early reflections is using the image source method (cf. Allen, J. B. and Berkley, D. A. (1979), "Image method for efficiently simulating small-room acoustics", J. Acoust. Soc. Am. 65 (4), pp. 943-950). Late reverberation, e.g., the reverberation energy and decay time, predominantly depends on the room volume, and the acoustic absorption from walls, floor, ceiling and objects in the room (cf. Sabine, W. C. (1922) "Collected Papers on Acoustics", Harvard University Press, USA). In a 'virtual' room (in the sense that this phrase is used herein), we can have early reflections and late reverberation that have properties (delays, directions, levels, decay times) that are not constrained by physics.

Examples of perceptually-motivated early reflections for a virtual room are set forth herein. Through subjective listening assessments we can determine early reflection delays, directions, spectral shape, and levels that maximize spatial audio quality for an audio source at a given direction and distance. The stochastic process further optimizes properties of the early reflections jointly with the late response, and takes into account effects of the direct response. From early reflections in a candidate BRIR (e.g., an optimal candidate BRIR as determined by optimization) we can work backwards to derive positions and acoustical properties of reflective surfaces in the virtual room required to deliver a corresponding level of spatial audio quality for the given sound source. When we repeat this process for a variety of sound source directions and distances, we find that the derived reflective surfaces are unique for each one. Each sound source is presented in its own virtual room, independently of the others. In a physical room, each reflective surface contributes in at least a small way to the BRIR for every sound source position, the properties of early reflections do not depend on HRTF nor the late response, and the early reflections are constrained by geometry and laws of physics.

In another class of embodiments, the invention is a method for generating a binaural signal in response to a set of channels (e.g., each of the channels, or each of the full frequency range channels) of a multi-channel audio input signal, including steps of: (a) applying a binaural room impulse response (BRIR) to each channel of the set (e.g., by convolving each channel of the set with a BRIR corresponding to said channel), thereby generating filtered signals, where each said BRIR has been designed (i.e., predetermined) in accordance with an embodiment of the invention; and (b) combining the filtered signals to generate the binaural signal.

In another class of embodiments, the invention is an audio processing unit (APU) configured to perform any embodiment of the inventive method. In another class of embodiments, the invention is an APU including a memory (e.g., a buffer memory) which stores (e.g., in a non-transitory manner) data indicative of a BRIR determined in accordance with any embodiment of the inventive method. Examples of APUs include, but are not limited to virtualizers, decoders, codecs, pre-processing systems (pre-processors), post-processing systems (post-processors), processing systems configured to generate BRIRs, and combinations of such elements.

NOTATION AND NOMENCLATURE

Figure 1:
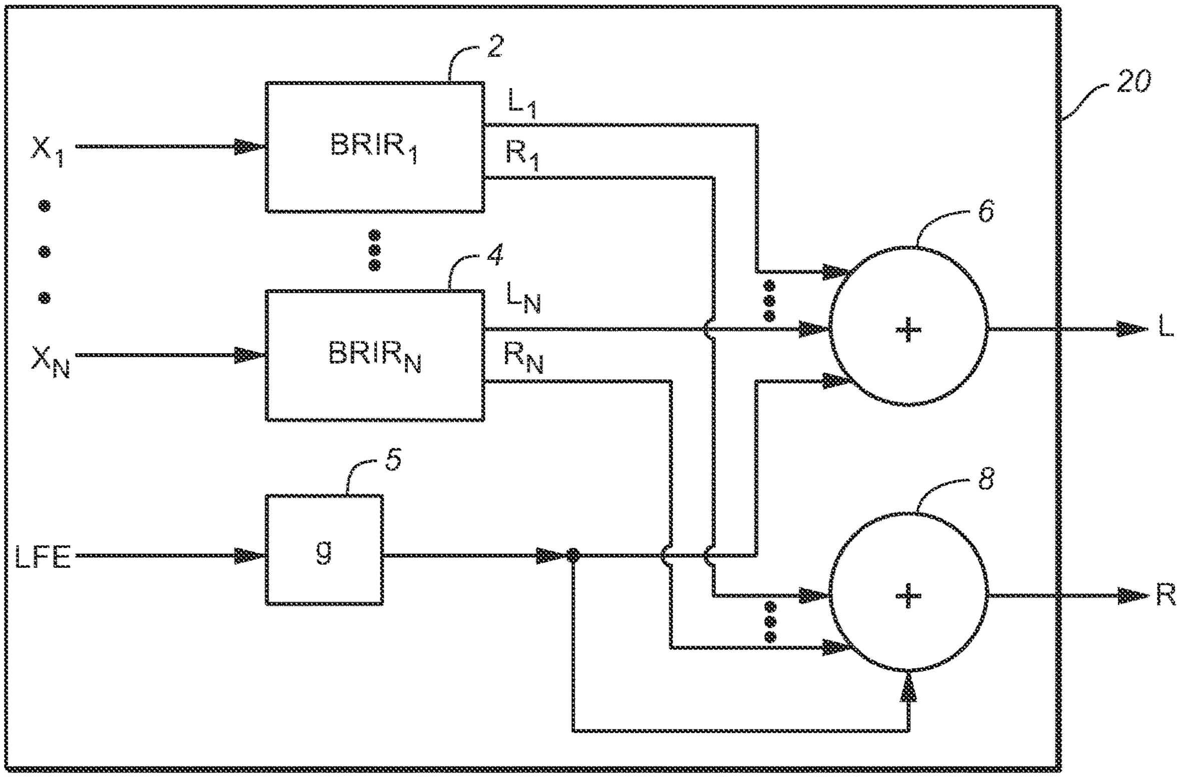
FIG. 1 is a block diagram of a system (20) including a headphone virtualization system (which can be implemented as an embodiment of the inventive headphone virtualization system). The headphone virtualization system can apply (in subsystems 2, . . . , 4) either conventionally determined BRIRs, or BRIRs determined in accordance with an embodiment of the invention.
Figure 2:
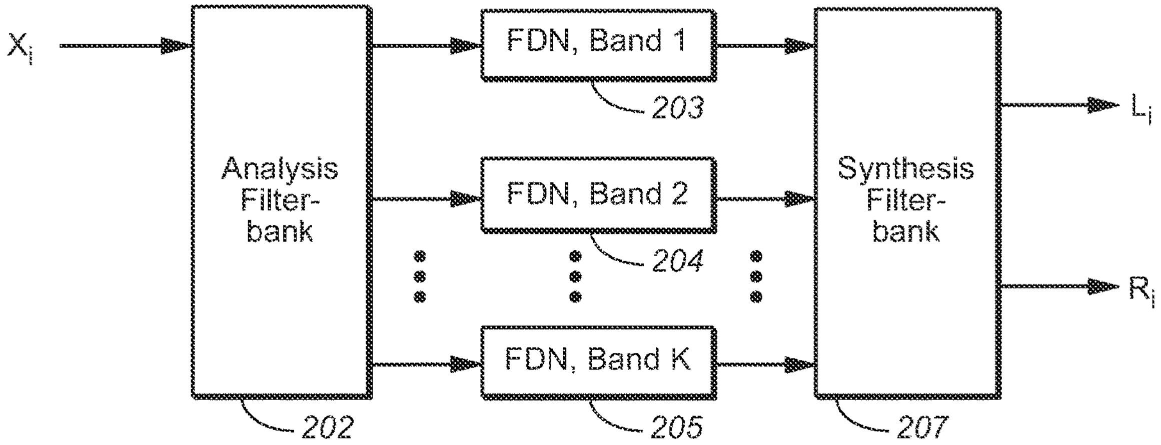
FIG. 2 (PRIOR ART)
FIG. 2 is a block diagram of an embodiment of one of subsystems 2, . . . , 4 of FIG. 1.
Figure 3:
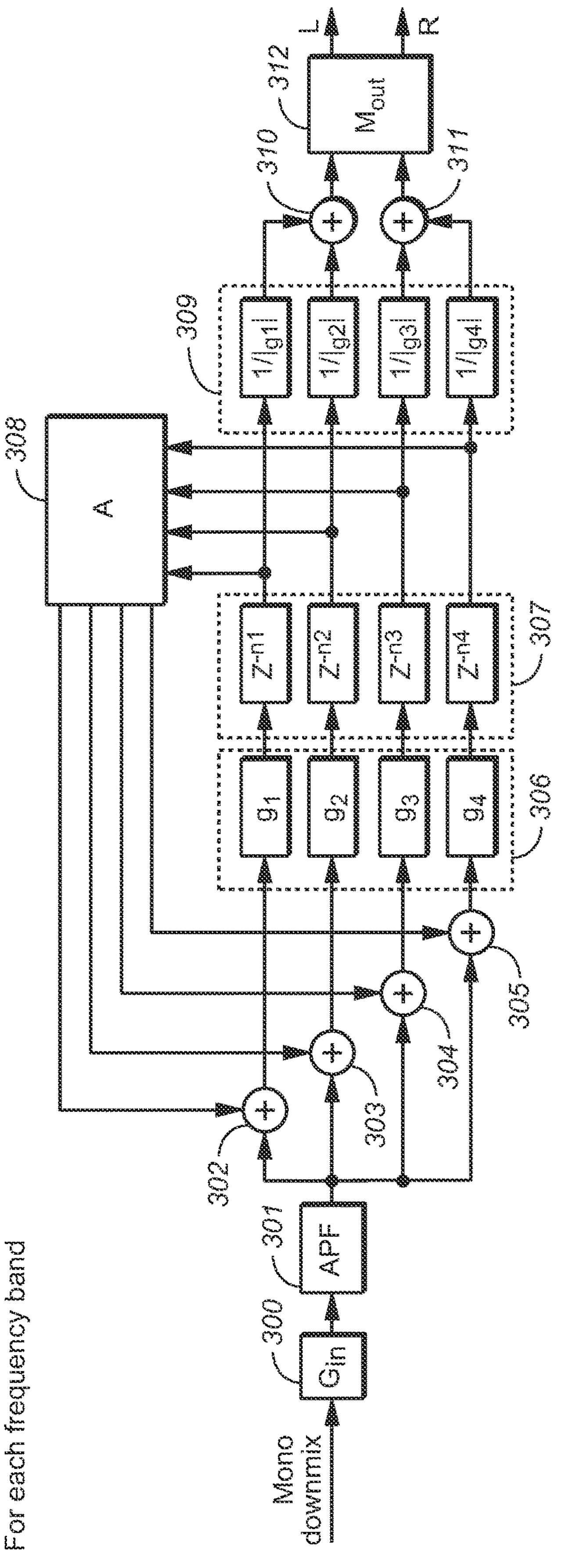
FIG. 3 (PRIOR ART)
FIG. 3 is a block diagram of an FDN of a type included in some implementations of the system of FIG. 2.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a virtualizer may be referred to as a virtualizer system, and a system including such a subsystem (e.g., a system that generates X output signals in response to multiple inputs, in which the subsystem generates M of the inputs and the other X-M inputs are received from an external source) may also be referred to as a virtualizer system (or virtualizer).

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expression "analysis filterbank" is used in a broad sense to denote a system (e.g., a subsystem) configured to apply a transform (e.g., a time domain-to-frequency domain transform) on a time-domain signal to generate values (e.g., frequency components) indicative of content of the time-domain signal, in each of a set of frequency bands. Throughout this disclosure including in the claims, the expression "filterbank domain" is used in a broad sense to denote the domain of the frequency components generated by an analysis filterbank (e.g., the domain in which such frequency components are processed).

Examples of filterbank domains include (but are not limited to) the frequency domain, the quadrature mirror filter (QMF) domain, and the hybrid complex quadrature mirror filter (HCQMF) domain. Examples of the transform which may be applied by an analysis filterbank include (but are not limited to) a discrete-cosine transform (DCT), modified discrete cosine transform (MDCT), discrete Fourier transform (DFT), and a wavelet transform. Examples of analysis filterbanks include (but are not limited to) quadrature mirror filters (QMF), finite-impulse response filters (FIR filters), infinite-impulse response filters (IIR filters), cross-over filters, and filters having other suitable multi-rate structures.

Throughout this disclosure including in the claims, the term "metadata" refers to separate and different data from corresponding audio data (audio content of a bitstream which also includes metadata). Metadata is associated with audio data, and indicates at least one feature or characteristic of the audio data (e.g., what type(s) of processing have already been performed, or should be performed, on the audio data, or the trajectory of an object indicated by the audio data). The association of the metadata with the audio data is time-synchronous. Thus, present (most recently received or updated) metadata may indicate that the corresponding audio data contemporaneously has an indicated feature and/or comprises the results of an indicated type of audio data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:

- speaker and loudspeaker are used synonymously to denote any sound-emitting transducer. This definition includes loudspeakers implemented as multiple transducers (e.g., woofer and tweeter);
- speaker feed: an audio signal to be applied directly to a loudspeaker, or an audio signal that is to be applied to an amplifier and loudspeaker in series;
- channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;
- audio program: a set of one or more audio channels (at least one speaker channel and/or at least one object channel) and optionally also associated metadata (e.g., metadata that describes a desired spatial audio presentation);
- speaker channel (or "speaker-feed channel"): an audio channel that is associated with a named loudspeaker (at a desired or nominal position), or with a named speaker zone within a defined speaker configuration. A speaker channel is rendered in such a way as to be equivalent to application of the audio signal directly to the named loudspeaker (at the desired or nominal position) or to a speaker in the named speaker zone;
- object channel: an audio channel indicative of sound emitted by an audio source (sometimes referred to as an audio "object"). Typically, an object channel determines a parametric audio source description (e.g., metadata indicative of the parametric audio source description is included in or provided with the object channel). The source description may determine sound emitted by the source (as a function of time), the apparent position (e.g., 3D spatial coordinates) of the source as a function of time, and optionally at least one additional parameter (e.g., apparent source size or width) characterizing the source;

object based audio program: an audio program comprising a set of one or more object channels (and optionally also comprising at least one speaker channel) and optionally also associated metadata (e.g., metadata indicative of a trajectory of an audio object which emits sound indicated by an object channel, or metadata otherwise indicative of a desired spatial audio presentation of sound indicated by an object channel, or metadata indicative of an identification of at least one audio object which is a source of sound indicated by an object channel); and render: the process of converting an audio program into one or more speaker feeds, or the process of converting an audio program into one or more speaker feeds and converting the speaker feed(s) to sound using one or more loudspeakers (in the latter case, the rendering is sometimes referred to herein as rendering "by" the loudspeaker(s)). An audio channel can be trivially rendered ("at" a desired position) by applying the signal directly to a physical loudspeaker at the desired position, or one or more audio channels can be rendered using one of a variety of virtualization techniques designed to be substantially equivalent (for the listener) to such trivial rendering. In this latter case, each audio channel may be converted to one or more speaker feeds to be applied to loudspeaker(s) in known locations, which are in general different from the desired position, such that sound emitted by the loudspeaker(s) in response to the feed(s) will be perceived as emitting from the desired position. Examples of such virtualization techniques include binaural rendering via headphones (e.g., using Dolby Headphone processing which simulates up to 7.1 channels of surround sound for the headphone wearer) and wave field synthesis.

The notation that a multi-channel audio signal is an "x.y" or "x.y.z" channel signal herein denotes that the signal has "x" full frequency speaker channels (corresponding to speakers nominally positioned in the horizontal plane of the assumed listener's ears), "y" LFE (or subwoofer) channels, and optionally also "z" full frequency overhead speaker channels (corresponding to speakers positioned above the assumed listener's head, e.g., at or near a room's ceiling).

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system, method, and medium will be described with reference to FIGS. 1, 4, 5, 6, 7, and 8.

As noted above, a class of embodiments of the invention comprises audio processing units (APUs) configured to perform any embodiment of the inventive method. In another class of embodiments, the invention is an APU including a memory (e.g., a buffer memory) which stores (e.g., in a non-transitory manner) data indicative of a BRIR determined in accordance with any embodiment of the inventive method.

System 20 of above-described FIG. 1 is an example of an APU including a headphone virtualizer (comprising above-described elements 2, . . . , 4, 5, 6, and 8). This virtualizer can be implemented as an embodiment of the inventive headphone virtualization system by configuring each of BRIR subsystems 2, . . . , 4 to apply a binaural room impulse response, BRIR 1, which has been determined in accordance with an embodiment of the invention, to each full frequency range channel $X_i$. With the virtualizer so configured, system 20 (which is a decoder, in some embodiments) is also an example of an APU which is an embodiment of the invention.

Figure 4:
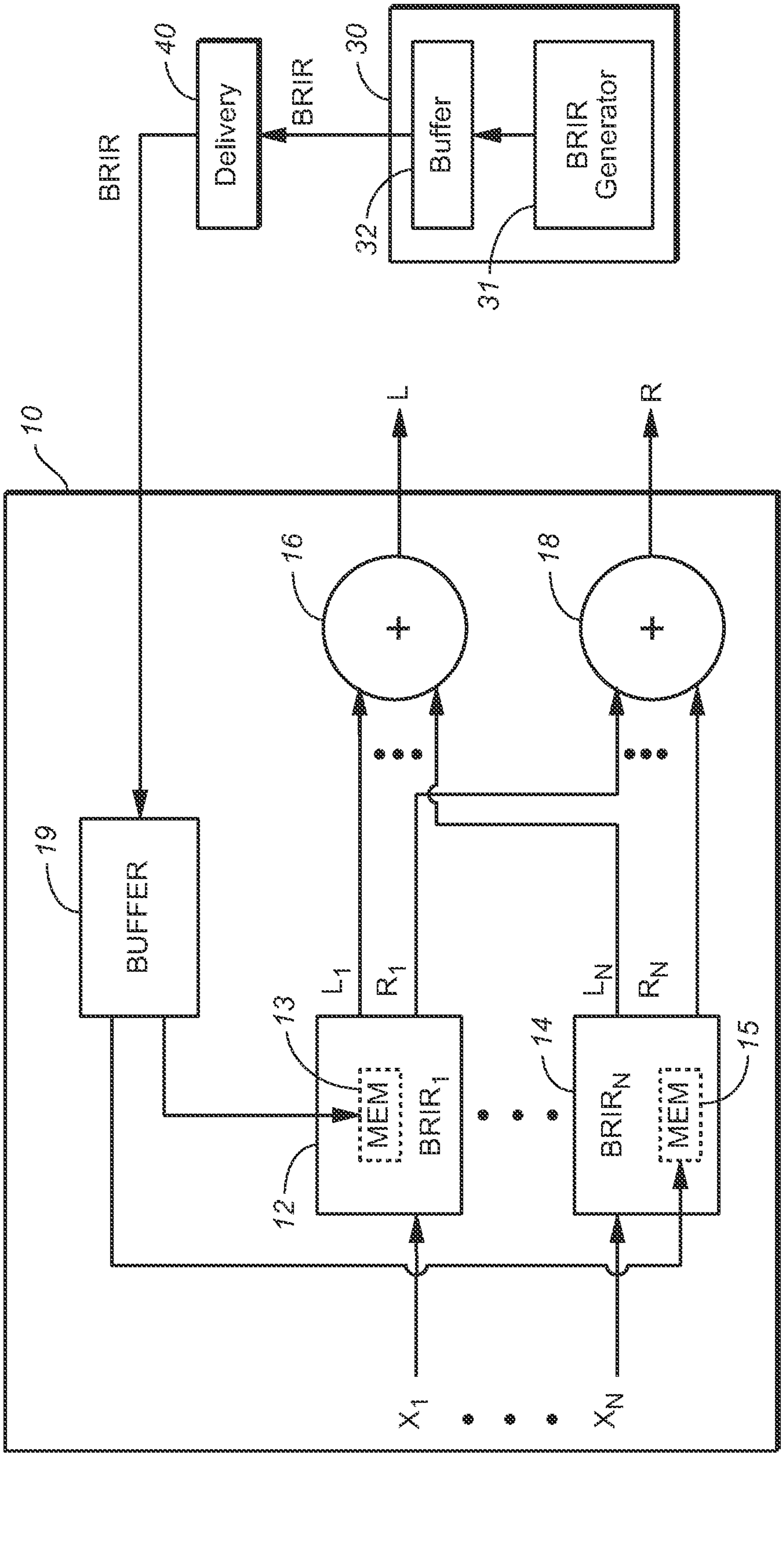
FIG. 4 is a block diagram of a system including APU 30 (configured to design BRIRs in accordance with an embodiment of the invention), APU 10 (configured to perform virtualization on channels of a multi-channel audio signal using the BRIRs), and delivery subsystem 40 (coupled and configured to deliver data, or signals, indicative of the BRIRs to APU 10).

Other exemplary embodiments of the inventive system are audio processing unit (APU) 30 of FIG. 4, and APU 10 of FIG. 4. APU 30 is a processing system configured to generate BRIRs in accordance with an embodiment of the invention. APU 30 includes processing subsystem ("BRIR generator") 31 which is configured to design BRIRs in accordance with any embodiment of the invention, and buffer memory (buffer) 32 coupled to BRIR generator 31. In operation, buffer 32 stores (e.g., in a non-transitory manner) data ("BRIR data") indicative of a set of BRIRs, each BRIR in the set having been designed (determined) in accordance with an embodiment of the inventive method. APU 30 is coupled and configured to assert a signal indicative of the BRIR data to delivery subsystem 40.

Delivery subsystem 40 is configured to store the signal (or to store BRIR data indicated by the signal) and/or to transmit the signal to APU 10. APU 10 is coupled and configured (e.g., programmed) to receive the signal (or BRIR data indicated by the signal) from subsystem 40 (e.g., by reading or retrieving the BRIR data from storage in subsystem 40, or receiving the signal that has been transmitted by subsystem 40). Buffer 19 of APU 10 stores (e.g., in a non-transitory manner) the BRIR data. BRIR subsystems 12, . . . , and 14, and addition elements 16 and 18 of APU 10 are a headphone virtualizer configured to apply a binaural room impulse response (one of the BRIRs determined by the BRIR data delivered by subsystem 40) to each full frequency range channel ($X_1$, . . . , $X_N$) of a multi-channel audio input signal.

To configure the headphone virtualizer, the BRIR data are asserted from buffer 19 to memory 13 of subsystem 12, and to memory 15 of subsystem 14 (and to a memory of each other BRIR subsystem coupled in parallel with subsystems 12 and 14 to filter one of audio input signal channels $X_1$, . . . , and $X_N$). Each of BRIR subsystems 12, . . . , and 14 is configured to apply any selected one of a set of BRIRs indicated by BRIR data stored therein, and thus storage of the BRIR data (which has been delivered to buffer 19) in each BRIR subsystem (12, . . . , or 14) configures the BRIR subsystem to apply a selected one of the BRIRs indicated by the BRIR data (a BRIR corresponding to a source direction and distance for audio content of channel $X_1$, . . . , or $X_N$) to one of the channels $X_1$, . . . , and $X_N$, of the multi-channel audio input signal.

Each of channels $X_1$, . . . , $X_N$, (which may be speaker channels or object channels) corresponds to a specific source direction and distance relative to an assumed listener (i.e., the direction of a direct path from, and the distance between, an assumed position of a corresponding speaker to the assumed listener position), and the headphone virtualizer is configured to convolve each such channel with a BRIR for the corresponding source direction and distance. Thus, subsystem 12 is configured to convolve channel $X_1$ with $BRIR_1$ (one of the BRIRs, determined by the BRIR data delivered by subsystem 40 and stored in memory 13, which corresponds to the source direction and distance of channel $X_1$), subsystem 4 is configured to convolve channel $X_N$ with $BRIR_N$ (one of the BRIRs, determined by the BRIR data delivered by subsystem 40 and stored in memory 15, which corresponds to the source direction and distance of channel $X_N$), and so on for each other input channel. The output of each BRIR subsystem (each of subsystems 12, . . . , 14) is a time-domain binaural signal including a left channel and a right channel (e.g., the output of subsystem 12 is a binaural signal including a left channel, $L_1$, and a right channel, $R_1$).

The left channel outputs of the BRIR subsystems are mixed in addition element 16, and the right channel outputs of the BRIR subsystems are mixed in addition element 18. The output of element 16 is the left channel, L, of the binaural audio signal output from the virtualizer, and the output of element 18 is the right channel, R, of the binaural audio signal output from the virtualizer.

APU 10 may be a decoder which is coupled to receive an encoded audio program, and which includes a subsystem (not shown in FIG. 4) coupled and configured to decode the program including by recovering the N full frequency range channels ($X_1$, . . . , $X_N$) therefrom and to provide them to elements 12, . . . , and 14 of the virtualizer subsystem (which comprises elements, 12, . . . , 14, 16, and 18, coupled as shown). The decoder may include additional subsystems, some of which perform functions not related to the virtualization function performed by the virtualization subsystem, and some of which may perform functions related to the virtualization function. For example, the latter functions may include extraction of metadata from the encoded program, and provision of the metadata to a virtualization control subsystem which employs the metadata to control elements of the virtualizer subsystem.

We next describe embodiments of the inventive method for BRIR design and/or generation. In a class of such embodiments, BRIR design is formulated as a numerical optimization problem based on a simulation model (which generates candidate BRIRs, preferably in accordance with perceptual cues and acoustic constraints) and at least one objective function (which evaluates each of the candidate BRIRs, preferably in accordance with perceptual criteria), and includes a step of identifying a best (e.g., optimal) one of the candidate BRIRs (as indicated by performance metrics determined for the candidate BRIRs by each objective function). Typically, each BRIR designed in accordance with the method (i.e., each candidate BRIR determined to be an optimal or "best" one of a number of candidate BRIRs) is useful for virtualization of speaker channels and/or object channels of multi-channel audio signals. Typically, the method includes a step of generating at least one signal indicative of each designed BRIR (e.g., a signal indicative of data indicative of each designed BRIR), and optionally also a step of delivering at least one said signal to a headphone virtualizer (or configuring a headphone virtualizer to apply at least one at least one designed BRIR). In typical embodiments, the numerical optimization problem is solved by applying any one of a number of methods that are well-known in the art (for example, random search (Monte Carlo), Simplex, or Simulated Annealing) to evaluate the candidate BRIRs in accordance with each objective function, and to identify a best (e.g., optimal) one of the candidate BRIRs as a BRIR which has been designed in accordance with the invention. In one exemplary embodiment, one objective function determines a performance metric (for each candidate BRIR) indicative of perceptual-domain frequency response, another determines a performance metric (for each candidate BRIR) indicative of temporal response, and another determines a performance metric (for each candidate BRIR) indicative of dialog clarity, and all three objective functions are employed to evaluate each candidate BRIR.

In a class of embodiments, the invention is a method for designing a BRIR (e.g., $BRIR_1$ or $BRIR_N$ of FIG. 4) which, when convolved with an input audio channel, generates a binaural signal indicative of sound from a source having a direction and a distance relative to an intended listener, said method including steps of:

(a) generating candidate BRIRs in accordance with a simulation model (e.g., the model implemented by subsystem 101 of the FIG. 5 implementation of BRIR generator 31 of FIG. 4) which simulates a response of an audio source, having a candidate BRIR direction and a candidate BRIR distance relative to an intended listener, where the candidate BRIR direction is at least substantially equal to the direction, and the candidate BRIR distance is at least substantially equal to the distance;

(b) generating performance metrics (e.g., those generated in subsystem 107 of the FIG. 5 implementation of BRIR generator 31 of FIG. 4), including a performance metric (referred to as a "figure of merit" in FIG. 5) for each of the candidate BRIRs, by processing the candidate BRIRs in accordance with at least one objective function; and (c) identifying (e.g., in subsystem 107 or 108 of the FIG. 5 implementation of BRIR generator 31 of FIG. 4) one of the performance metrics having an extremum value, and identifying, as the BRIR, one of the candidate BRIRs for which the performance metric has said extremum value. When two or more objective functions are employed, the performance metric for each candidate BRIR may be an "overall" performance metric which is an appropriately weighted combination of individual performance metrics (each individual performance metric determined in accordance with a different one of the objective functions) for the candidate BRIR. The candidate BRIR whose overall performance metric has an extremum value (sometimes referred to as a "surviving BRIR") would then be identified in step (c).

Typically, step (a) includes a step of generating the candidate BRIRs in accordance with predetermined perceptual cues such that each of the candidate BRIRs, when convolved with the input audio channel, generates a binaural signal indicative of sound which provides said perceptual cues. Examples of such cues include (but are not limited to): interaural time difference and interaural level difference (e.g., as implemented by subsystems 102 and 113 of the FIG. 6 embodiment of simulation model 101 of FIG. 5), interaural coherence (e.g., as implemented by subsystems 110 and 114 of the FIG. 6 embodiment of simulation model 101 of FIG. 5), reverberation time (e.g., as implemented by subsystems 110 and 114 of the FIG. 6 embodiment of simulation model 101), direct-to-reverberant ratio (e.g., as implemented by combiner 115 of the FIG. 6 embodiment of simulation model 101), early reflection-to-late response ratio (e.g., as implemented by combiner 115 of the FIG. 6 embodiment of simulation model 101), and echo density (e.g., as implemented by subsystems 110 and 114 of the FIG. 6 embodiment of simulation model 101 of FIG. 5).

In typical embodiments, the simulation model is a stochastic room/head model (e.g., implemented in BRIR generator 31 of FIG. 4). During numerical optimization (to select a best one of a set of candidate BRIRs), the stochastic model generates each of the candidate BRIRs such that each candidate BRIR (when applied to input audio to generate filtered audio intended to be perceived as emitting from a source having predetermined direction and distance relative to an intended listener) inherently applies auditory cues essential to the intended spatial audio perception ("spatial audio perceptual cues") while minimizing room effects that cause coloration and time-smearing artifacts.

The stochastic model typically uses a combination of deterministic and random (stochastic) elements. Deterministic elements, such as the essential perceptual cues, serve as constraints on the optimization process. Random elements, such as room reflection waveform shape for the early and late responses, generate random variables that appear in the formulation of the BRIR optimization problem itself.

The degree of similarity between each candidate and an ideal BRIR response ("target" or "target BRIR") is numerically evaluated (e.g., in BRIR generator 31 of FIG. 4) using each said objective function (which in turn determines a metric of performance for each of the candidate BRIRs). The optimal solution is taken to be the simulation model output (candidate BRIR) which yields a performance metric (determined by the objective function(s)) having an extremum value, i.e., the candidate BRIR which has a best metric of performance (determined by the objective function(s)). Data indicative of the optimal (best) candidate BRIR for each sound source direction and distance are generated (e.g., by BRIR generator 31 of FIG. 4) and stored (e.g., in buffer memory 32 of FIG. 4) and/or delivered to a virtualizer system (e.g., the virtualizer subsystem of APU 10 of FIG. 4).

Figure 5:
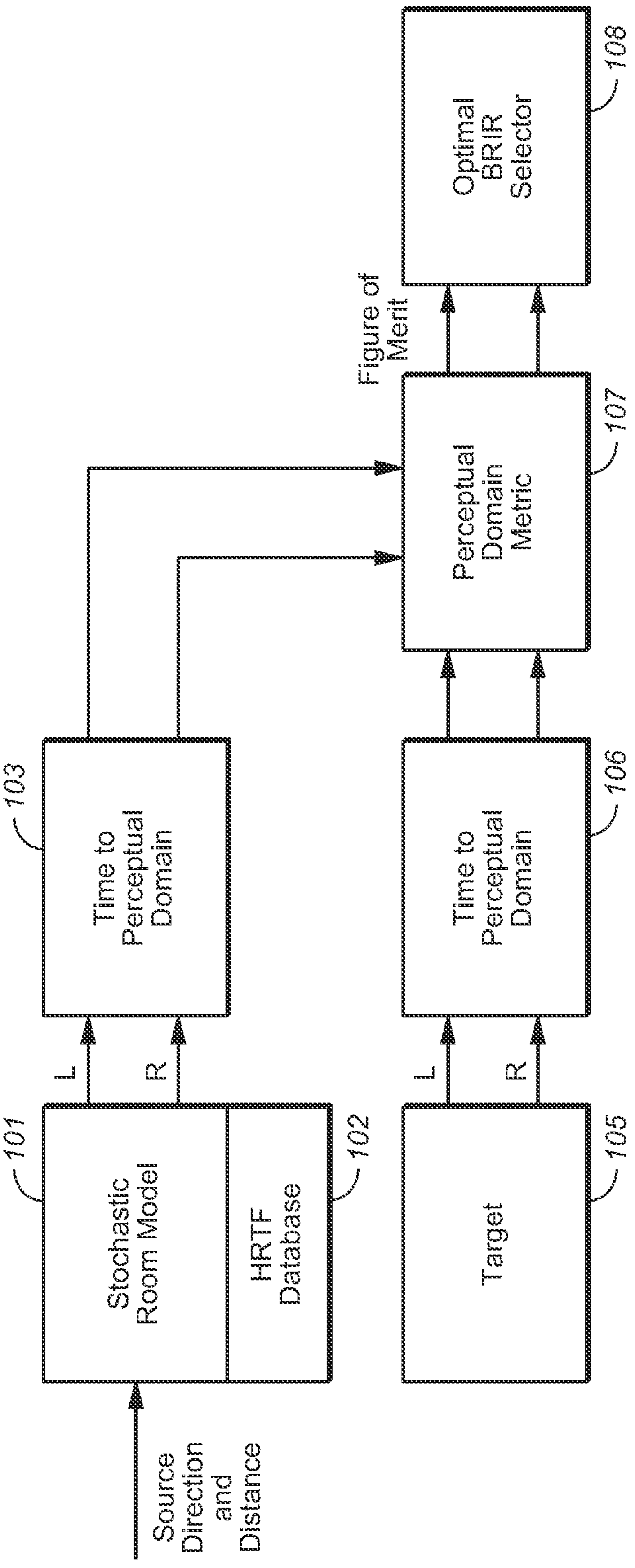
FIG. 5 is a block diagram of an embodiment of a system configured to perform an embodiment of the inventive BRIR design and generation method.

FIG. 5 is a block diagram of a system (which may be implemented by BRIR generator 31 of FIG. 4, for example) which is configured to perform an embodiment of the inventive BRIR design and generation method. This embodiment selects an optimal BRIR candidate from a plurality of such candidate BRIRs using one or more perceptually-motivated distortion metrics.

Stochastic room model subsystem 101 of FIG. 5 is configured to apply a stochastic room model to generate candidate BRIRs. Control values indicative of a sound source direction (azimuth and elevation) and distance (from the assumed listener position) are provided as input to stochastic room model subsystem 101, which has access to an HRTF database (102) for looking up a direct response (a pair of left and right HRTFs) corresponding to the source direction and distance. Typically, database 102 is implemented as a memory (which stores each selectable HRTF) which is coupled to and accessible by subsystem 101. In response to the HRTF pair (selected from database 102 for a source direction and distance, subsystem 101 produces a sequence of candidate BRIRs, each candidate BRIR comprising a candidate left impulse response and a candidate right impulse response. Transform and frequency banding stage 103 is coupled and configured to transform each of the candidate BRIRs from the time domain to a perceptual domain (perceptually banded frequency domain) for comparison with a perceptual-domain representation of a target BRIR. Each perceptual-domain candidate BRIR output from stage 103 is a sequence of values (e.g., frequency components) indicative of content of a time-domain candidate BRIR, in each of a set of perceptually determined frequency bands (e.g., frequency bands which approximate the non-uniform frequency bands of the well known psychoacoustic scale known as the Bark scale).

Target BRIR subsystem 105 is or includes a memory which stores the target BRIR, which has been predetermined and provided to subsystem 105 by the system operator. Transform stage 106 is coupled and configured to transform the target BRIR from the time domain to the perceptual domain. Each perceptual-domain target BRIR output from stage 106 is a sequence of values (e.g., frequency components) indicative of content of a time-domain target BRIR, in each of a set of perceptually determined frequency bands.

Subsystem 107 is configured to implement at least one objective function which determines a perceptual-domain metric of BRIR performance (e.g., suitability) of each of the candidate BRIRs. Subsystem 107 numerically evaluates a degree of similarity between each candidate BRIR and the target BRIR in accordance with each said objective function. Specifically, subsystem 107 applies each objective function (to each candidate BRIR and the target BRIR) to determine a metric of performance for each candidate BRIR.

Subsystem 108 is configured to select, as the optimal BRIR, one of the candidate BRIRs which has a best metric of performance (e.g., a best overall performance metric, of the type mentioned above) as indicated by the output of subsystem 107). For example, the optimal BRIR can be selected to be one of the candidate BRIRs having a largest degree of similarity to the target BRIR (as indicated by the output of subsystem 107). In the ideal case, the objective function(s) represent all aspects of virtualizer subjective performance, including but not limited to: spectral naturalness (timbre relative to the stereo downmix); dialog clarity; and sound source localization, externalization, and width. A standardized method that could serve as an objective function for evaluating dialog clarity is Perceptual Evaluation of Speech Quality (PESQ) (cf. ITU-T Recommendation P.862.2, "Wideband extension to Recommendation P.862 for the assessment of wideband telephone networks and speech codecs", November 2007.

As a result of simulations, the inventors have found that a gain-optimized log-spectral distortion measure, D (defined below), is a useful perceptual-domain metric. This metric provides (for each candidate BRIR and target BRIR pair) a measure of spectral naturalness of audio signals rendered by the candidate BRIR. Smaller values of D correspond to BRIRs that produce lower timbral distortion and more natural quality of rendered audio signals. This metric, D, is determined from the following objective function (which subsystem 107 of FIG. 5 can readily be configured to implement) expressed in the perceptual domain (operating on the critical-band power spectrum of the target BRIR and the critical-band power spectrum of the target BRIR):

$$D = \sqrt{\frac{1}{B}\sum_{n=1}^{2} w_n \sum_{k=0}^{B} [\log(C_{nk}) - \log(T_{nk}) + g_{log}]^2}$$

where D=average log-spectral distortion, $C_{nk}$=Perceptual energy for channel n, frequency band k of the candidate BRIR, $T_{nk}$=Perceptual energy for channel n, frequency band k of the target BRIR, $g_{log}$=log gain offset that minimizes D, $w_n$=channel weighting factor for channel n, and B=the number of perceptual bands.

In some embodiments of the inventive method which generate a performance metric at least substantially equal to the above metric, D, for each candidate BRIR, the method includes a step of comparing a perceptually banded, frequency domain representation of each of the candidate BRIRs with a perceptually banded, frequency domain representation of the target BRIR corresponding to the source direction for said each of the candidate BRIRs. Each such perceptually banded, frequency domain representation (of a candidate BRIR or a corresponding target BRIR) comprises a left channel having B frequency bands and a right channel having B frequency bands. The index, n, in the above expression for the metric, D, is an index indicative of channel, whose value n=1 indicates the left channel, and whose value n=2 indicates the right channel.

A useful attribute of the above-defined metric D is that it is sensitive to spectral combing distortion at low frequencies, a common source of unnatural audio quality in virtualizers. The metric D is also insensitive to broadband gain offsets between the candidate and target BRIRs due to the above term $g_{log}$, which is defined as follows in a typical embodiment of the inventive method (implemented in accordance with FIG. 5):

$$g_{log} = \frac{1}{B}\sum_{n=1}^{2} w_n \sum_{k=0}^{B} [\log(C_{nk}) - \log(T_{nk})]$$

In such an embodiment, the term $g_{log}$ is computed separately (by subsystem 107) for each candidate BRIR in a manner that minimizes the resulting mean-square distortion D for the candidate BRIR.

Other performance metrics could be implemented by subsystem 107 (in place of, or to supplement, the above-defined metric D) to evaluate different aspects of candidate BRIR performance. Additionally, the above expressions for D and $g_{log}$ can be modified (to determine another distortion measure, for use in place of metric D, expressed in the specific loudness domain) by replacing the $\log(C_{nk})$ and $\log(T_{nk})$ terms in the above expressions for D and $g_{log}$, by the specific loudness in critical bands of the candidate and target BRIRs, respectively.

The inventors have also found that in typical embodiments of the invention, the anechoic HRTF response, equalized with a direction-independent equalization filter, is a suitable target BRIR (to be output from subsystem 105 of FIG. 5). When the objective function applied by subsystem 107 determines the gain-optimized log-spectral distortion, D, to be the performance metric, the degree of spectral coloration is typically significantly lower than that for traditional listening room models.

In accordance with the FIG. 5 embodiment, typical implementations of subsystem 101 generate each of the candidate BRIRs as a sum of direct and early and late impulse response portions (BRIR regions), in a manner to be described with reference to FIG. 6. As noted above with reference to FIG. 5, the sound source direction and distance indicated to subsystem 101 determine the direct response of each candidate BRIR, by causing subsystem 101 to select a corresponding pair of left and right HRTFs (direct response BRIR portions) from HRTF database 102.

Reflection control subsystem 111 identifies (i.e., chooses) a set of early reflection paths (comprising one or more early reflection paths) in response to the same sound source direction and distance which determine the direct response, and asserts control values indicative of each such set of early reflection paths to early reflection generation subsystem (generator) 113. Early reflection generator 113 selects a pair of left and right HRTFs from database 102 which correspond to the direction of arrival (at the listener) of each early reflection (of each set of early reflection paths) determined by subsystem 111 in response to the same sound source direction and distance which determine the direct response. In response to the selected pair(s) of left and right HRTFs for each set of early reflection paths determined by subsystem 111, generator 113 determines an early response portion of one of the candidate BRIRs.

Late response control subsystem 110 asserts control signals to late response generator 114, in response to the same sound source direction and distance which determine the direct response, to cause generator 114 to output a late response portion of one of the candidate BRIRs which corresponds to the sound source direction and distance.

The direct response, early reflections, and late response are summed together (with appropriate time offsets and overlap) in combiner subsystem 115 to generate each candidate BRIR. Control values asserted to subsystem 115 are indicative of a direct-to-reverb ratio (DR Ratio) and an early reflection-to-late response ratio (EL Ratio) which are used by subsystem 115 to set the relative gains of direct, early, and late BRIR portions which it combines.

Figure 6:
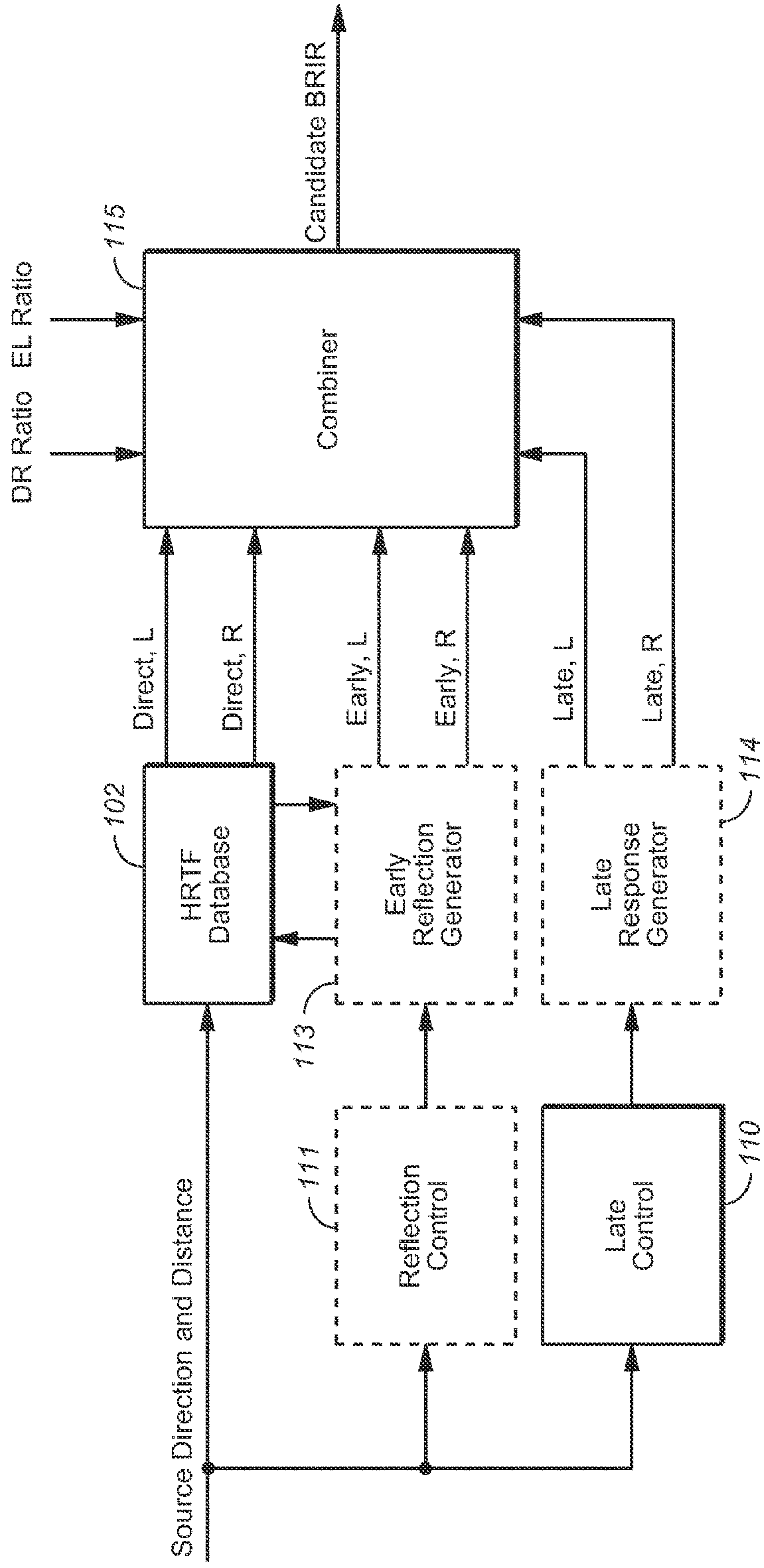
FIG. 6 is a block diagram of a typical implementation of subsystem 101 (with HRTF database 102) of FIG. 5, which is configured to generate a sequence of candidate BRIRs.

The subsystems of FIG. 6 indicated by dashed boxes (i.e., subsystems 111, 113, and 114) are stochastic elements, in the sense that each outputs a sequence of outputs (driven in part by random variables) in response to each sound source direction and distance asserted to subsystem 101. In operation, the FIG. 6 embodiment generates at least one sequence of random (e.g., pseudo-random) variables, and the operations performed by subsystems 111, 113, and 114 (and thus the generation of candidate BRIRs) is driven in part by at least some of the random variables. Thus, in response to each sound source direction and distance asserted to subsystem 101, subsystem 111 determines a sequence of sets of early reflection paths, and subsystems 113 and 114 assert to combiner 115 a sequence of early reflection BRIR portions and late response BRIR portions. In response, combiner 115 combines each set of early reflection BRIR portions in the sequence with each corresponding late response BRIR portion in the sequence, and with the HRTF selected for the sound source direction and distance, to generate each candidate BRIR of a sequence of candidate BRIRs. The random variables which drive subsystems 111, 113, and 114 should provide sufficient degrees of freedom to enable the FIG. 6 implementation of the stochastic room model to generate a diverse set of candidate BRIRs during optimization.

Typically, reflection control subsystem 111 is implemented to impose the desired delay, gain, shape, duration, and/or direction of the early reflection(s) of the sets of early reflections indicated by its output. Typically, late response control subsystem 110 is implemented to vary the interaural coherence, echo density, delay, gain, shape, and/or duration to the raw random sequences in order to generate the late responses indicated by its output.

In variations on the FIG. 6 implementation of the stochastic room model, each late response portion output from subsystem 114 may be generated by a semi-deterministic or fully deterministic process (e.g., it may be a predetermined late-reverberation impulse response, or may be determined by an algorithmic reverberation algorithm, e.g., one implemented by a unitary-feedback delay network (UFDN), or a Schroeder reverberation algorithm).

In typical implementations of subsystem 111 of FIG. 6, the number of early reflection(s) and the direction-of-arrival of each early reflection, in each set of early reflections determined by subsystem 111 are based on perceptual considerations. For example, it is well-known that including an early floor reflection in a BRIR is important to good source localization in headphone virtualizers. However, the inventors have further found that:

- early reflections emanating from the same azimuth and elevation as the sound source can improve source localization and focus, and increase perceived distance;
- as early reflections emanate from wider angles away from the sound source direction, the sound source size generally becomes larger and more diffuse;
- an early reflection from a desk can be even more effective than the floor for frontal sound sources; and
- early reflections with a direction of arrival opposite to that of the sound source may add a sense of spaciousness, but at the cost of localization performance. For example, floor reflections have been found to degrade performance for overhead sound sources.

It is contemplated that subsystem 111 be implemented to determine the sets of early reflections (for each source direction and distance) in accordance with such perceptual considerations.

The inventors have also found that certain reflection direction spreading patterns can improve source localization. As suggested by the observation noted above that early reflections emanating from the same azimuth and elevation as the sound source can improve source localization and focus, and increase perceived distance), one strategy for implementation by subsystem 111 that was found to be particularly effective is to design the early reflection(s) for a given source direction and distance to originate from the same direction as the sound source, and to progressively fan out in space during the late response to eventually surround the listener.

From the above findings, it is evident that important aspects of sound image control is provided by the early reflections, and the manner in which they transition to the late BRIR response. For optimal virtualizer performance, reflections (e.g., those determined by the output of subsystem 111 of FIG. 6) should be customized for each sound source. For example, adding an independent virtual wall behind each sound source and perpendicular to the line that sound travels from the source to the ear (as indicated by the output of subsystem 111) can improve performance of a candidate BRIR. This configuration is made even more effective for frontal sources by configuring subsystem 111 so that its output is also indicative of a floor or desk reflection. Such a perceptually-motivated arrangement of early reflections is easily implemented by the FIG. 6 embodiment of the invention, but would be at best difficult to implement in a traditional room model (having an arrangement of reflective surfaces with fixed relative orientations and not perceptually optimized for each sound source), especially when the virtualizer is required to support moving sound sources (audio objects).

Figure 7:
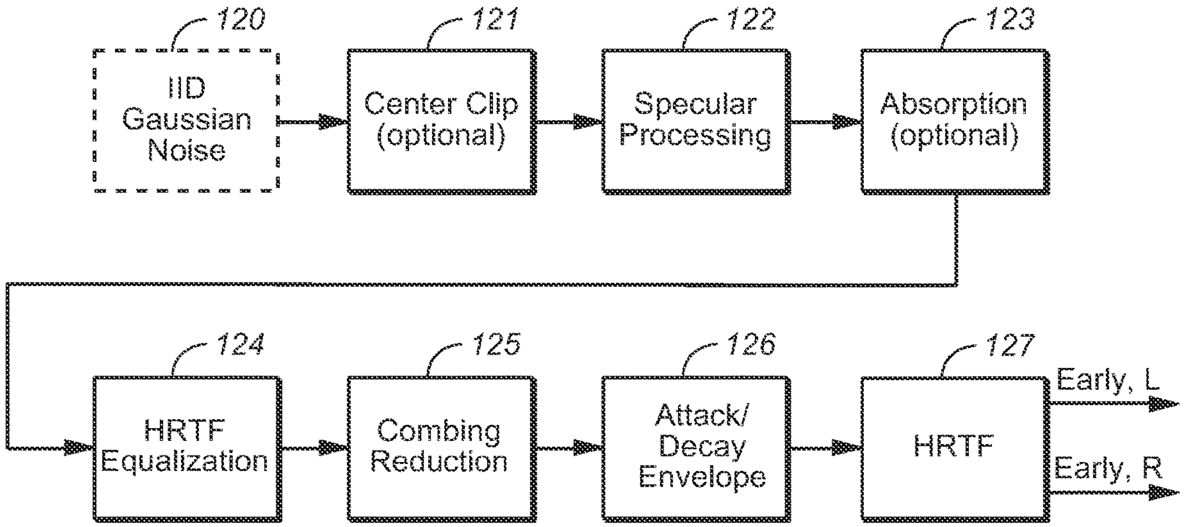
FIG. 7 is an embodiment of subsystem 113 of FIG. 6.

Next, with reference to FIG. 7 we describe an embodiment of early reflection generator 113 of FIG. 6. Its purpose is to synthesize early reflections using parameters received from reflection control subsystem 111. The FIG. 7 embodiment of generator 113 combines traditional room model elements with two perceptually-motivated elements. Gaussian Independent and Identically Distributed (IID) noise generator 120 of the FIG. 7 is configured to generate noise for use as reflection prototypes. A unique noise sequence is selected for each reflection in every candidate BRIR, providing multiple degrees of freedom in the reflection frequency responses. The noise sequence is optionally modified by center clip subsystem 121 (if present) to replace each input value (of the sequence asserted to subsystem 121) by a zero output value if the absolute value of the input is smaller than a predetermined percentage of a maximum input value, and is modified by specular processing subsystem 122 (which adds a specular reflection component thereto). Optionally, filter 123 (if implemented), which models absorption of the reflecting surface(s), is applied next, followed by a direction-independent HRTF equalization filter 124. In the next processing stage, combing reduction stage 125, the output of filter 124 undergoes highpass filtering with a delay-dependent cutoff frequency. The cutoff frequency is selected individually for each reflection so as to maximize low-frequency energy under the constraint of acceptable spectral combing in the rendered audio signal. The inventors have found from theoretical considerations and practice that setting the normalized cutoff frequency to 1.5 divided by the reflection delay (in samples) typically works well in achieving the design constraint.

Attack and decay envelope modification stage 126 modifies the attack and decay characteristics of the reflection prototype which is output from stage 125, by applying a window. A variety of window shapes are possible, but an exponentially-decaying window is typically suitable. Finally, HRTF stage 127 applies the HRTF (retrieved from HRTF database 102 of FIG. 6) which corresponds to the reflection direction-of-arrival, producing a binaural reflection prototype response which is asserted to combiner subsystem 115 of FIG. 6.

Subsystems 120 and 127 of FIG. 7 are stochastic elements, in the sense that each outputs a sequence of outputs (driven in part by random variables) in response to each sound source direction and distance asserted to subsystem 101. In operation, subsystems 122, 123, 125, 126, and 127 of FIG. 7 receive inputs from reflection control subsystem 111 (of FIG. 6)

Figure 8:
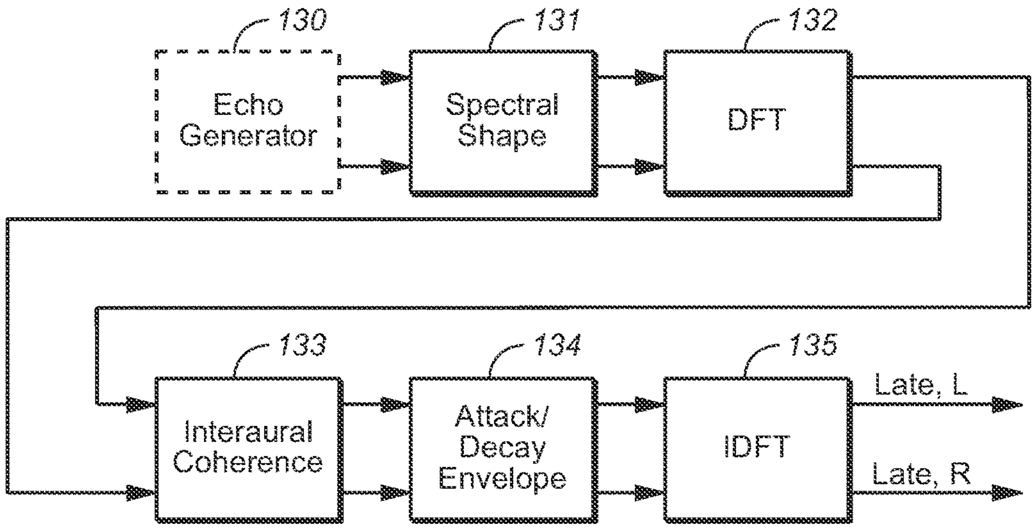
FIG. 8 is an embodiment of subsystem 114 of FIG. 6.

Next, with reference to FIG. 8 we describe an embodiment of late response generator 114 of FIG. 6.

In typical implementations, the generation of the late response is based on a stochastic model that imparts essential temporal, spectral and spatial acoustic attributes to the candidate BRIR. As in a physical acoustic space, during the early reflection stage, reflections arrive at the ears sparsely such that the micro structure of each reflection is observable and affects auditory perception. In the late response stage, the echo density typically increases to the point where micro features of individual reflections are no longer observable. Instead, the macro attributes of the reverberation become the essential auditory cues. These frequency-dependent attributes include energy decay time, interaural coherence, and spectral distribution.

The transition from early response stage to late response stage is a progressive process. Implementing such a transition in the generated late response helps focus sound source images, reduce spatial pumping, and improve externalization. In typical embodiments, the transition implementation involves controlling the temporal patterns of echo density, interaural time differential or "ITD," and interaural level differential or "ILD" (e.g., using echo generator 130 of FIG. 8). The echo density typically increases quadratically with time. Here the similarity with physical acoustic spaces ends. The inventors have found that the sound source image is most compact, stable, and externalized if the initial ITD/ILD pattern reinforces that of the source direction. While the echo density is low, the ITD/ILD pattern in the generated late response resembles that of directional sources corresponding to individual reflections. As the echo density increases, ITD/ILD directivity starts to widen and gradually evolve into the pattern of a diffuse sound field.

Generating late responses with the transitional characteristics described above can be achieved by a stochastic echo generator (e.g., echo generator 130 of FIG. 8). The operation of a typical implementation of echo generator 130 includes the following steps:

1. At every time instant as the echo generator progressing along the time axis, throughout the length of the late response, an independent random binary decision is first implemented to decide whether a reflection should be generated at the given time instant. The probability of a positive decision increases with time, ideally quadratically, for increasing echo density. If a reflection is to be generated, a pair of single impulses, each in one of the binaural channels, is generated with the desired ITD/ILD characteristics. The process of ITD/ILD control typically includes the following sub-steps:
   a. generate a first interaural delay value, $d_{DIR}$, which is equal to the ITD of the source direction. Also generate a first random sample value pair (a 1×2 vector), $x_{DIR}$, which carries the ILD of the source direction. The ITD and ILD can be determined based on either the HRTF associated with the source direction or a suitable head model. The sign of the two sample values should be identical. The average value of the two samples should roughly follow normal distribution with zero mean and unit standard deviation.
   b. generate a second interaural delay value, $d_{DIF}$, randomly which follows the ITD pattern of reflections from a diffuse sound field. Also generate a second random sample value pair (a 1×2 vector), $x_{DIF}$, which follows the ILD pattern of reflections from a diffuse sound field. The diffuse field ITD can be modeled by a random variable with uniform distribution between $-d_{MAX}$ and $d_{MAX}$, where $d_{MAX}$ is the delay corresponding to the distance between the ears. The sample values can originate from independent normal distribution with zero mean and unit standard deviation, and then be modified based on the diffuse field ILD constraint. The sign of the two values in $x_{DIF}$ should be identical.
   c. compute the weighted averages of the two interaural delays, $d_{REF}=(1-\alpha)\ d_{DIR}+\alpha\ d_{DIF}$, and the two sample value pairs, $x_{REF}=(1-\alpha)x_{DIR}+\alpha x_{DIF}$. Here $\alpha$ is a mixing weight between 0 and 1.
   d. create a binaural impulse pair based on $d_{REF}$ and $x_{REF}$. The impulse pair is placed around the current time instant with a time spread of $|d_{REF}|$, and the sign of $d_{REF}$ determines which binaural channel would lead. The sample value in $x_{REF}$ with the larger absolute value is used as the sample value for the leading impulse, and the other is used as the trailing impulse. If any of the impulse of the pair is to be place at a time slot that is already used in previous time instants (due the time spread for interaural delay), it is preferred that the new value is added to the existing value rather than replaces it; and
2. Repeat Step 1 until the end of the BRIR late response is reached. The weight a is set to 0.0 at the beginning of the late response and gradually increased to 1.0 to create the directional-to-diffuse transition effect on ITD/ILD.

In other implementations of late response generator 114, other methods are performed to create similar transitional behavior. In order to introduce the diffusion and decorrelation effects to the reflections for improved naturalness, a pair of multi-stage all-pass filters (APFs) may be applied to the left- and right-channels of the generated binaural response, respectively, as the final step performed by echo generator 130. The inventors have found that for best performance in common applications, the time-spreading effect of the APFs should be in the order of 1 ms, with maximum binaural decorrelation possible. The APFs also need to have the same group delay in order to maintain binaural balance.

As noted earlier, the macro attributes of the late response have profound and critical perceptual impact, both spatially and timbrally. The energy decay time is an essential attribute that characterize the acoustic environment. Lengthy decay time causes excess and unnatural reverberation that degrades audio quality. It is especially detrimental to dialog clarity. On the other hand, insufficient decay time reduces externalization and causes mismatch to the acoustic space. Interaural coherence is essential to the focus of sound source images and depth perception. A too-high coherence value causes the sound source image to become internalized, and a too-low coherence value causes the sound source image to spread or split. Ill-balanced coherence across frequency also causes the sound source image to stretch or split. Spectral distribution of the late response is essential to the timbre and naturalness. The ideal spectral distribution for the late response usually has flat and highest level between 500 Hz and 1 kHz. It tapers off at the high-frequency end to follow a natural acoustic characteristic and at the low-frequency end to avoid combing artifact. As an extra mechanism to reduce combing, the ramp-up of the late response is made slower in the lower frequency.

To impose these macro attributes, the FIG. 8 embodiment of late response generator 114 is configured as follows. The output of stochastic echo generator 130 is filtered by spectral shaping filter 131 (in the time domain in FIG. 8, but alternatively in the frequency domain after the DFT filterbank 132), and the output of filter 131 is decomposed (by DFT filterbank 132) into frequency bands. In each frequency band, a 2×2 mixing matrix (implemented by stage 133) is applied to introduce desired interaural coherence (between the left and right binaural channels) and a temporal shaping curve is applied (by stage 134) to enforce desired energy attack and decay times. Stage 134 can also apply a gain to control the desired spectral envelope. After these processes, the subband signals are assembled back to the time domain (by inverse DFT filterbank 135). It should be noted that the order of functions performed by blocks 131, 133, and 134 is interchangeable. The two channels (left and right binaural channels) of the output of filterbank 135 are the late response portion of the candidate BRIR.

The late response portion of the candidate BRIR is combined (in subsystem 115 of FIG. 6) with the direct and early BRIR components with proper delay and gain based on the source distance, direct to reverb (DR) ratio, and early reflection to late response (EL) ratio.

In the FIG. 8 implementation of late response generator 114, a DFT filterbank 132 is used for conversion from the time domain to the frequency domain, inverse DFT filterbank 135 is used for conversion from the frequency domain to the time domain, and spectral shaping filter 131 is implemented in the time-domain. In other embodiments, another type of analysis filterbank (replacing DFT filterbank 132) is used for conversion from the time domain to the frequency domain, and another type of synthesis filterbank (replacing inverse DFT filterbank 135) is used for conversion from the frequency domain to the time domain, or the late response generator is implemented entirely in the time domain.

One benefit of typical embodiments of the inventive numerically-optimized BRIR generation method is that they can readily generate a BRIR which meets any of a wide range of design criteria (e.g., the HRTF portion thereof has certain desired properties, and/or the BRIR has a desired direct-to-reverberation ratio). For example, it is well known that HRTFs vary considerably from one person to the next. Typical embodiments of the inventive method generate BRIRs that allow optimization of the virtual listening environment for a specific set of HRTFs associated with a specific listener. Alternatively or additionally, the physical environment in which a listener is situated may have specific properties such as a certain reverberation time that one wants to mimic in the virtual listening environment (and corresponding BRIRs). Such design criteria can be included as constraints in the optimization process. Yet another example is the situation in which a strong reflection is expected at the listener's position due to the presence of a desk or a wall. The generated BRIRs can be optimized based on the perceptual distortion metric given such constraints.

It should be appreciated that in some embodiments, a binaural output signal generated in accordance with the invention is indicative of audio content that is intended to be perceived as emitting from "overhead" source locations (virtual source locations above the horizontal plane of the listener's ears) and/or audio content that is perceived as emitting from virtual source locations in the horizontal plane of the listener's ears. In either case, the BRIR employed to generate the binaural output signal would typically have an HRTF portion (for the direct response that corresponds to the sound source direction and distance), and a reflection (and/or reverb) portion for implementing reflections and late response derived from a model of a physical or virtual room.

To render a binaural signal indicative of audio content perceived as emitting from "overhead" source locations, the rendering method employed would typically be the same as a conventional method for rendering a binaural signal indicative only of audio content intended to be perceived as emitting from virtual source locations in the horizontal plane of the listener's ears.

The illusion of height provided by a BRIR which is simply an HRTF alone (without an early reflection or late response portion) can be increased by augmenting the BRIR to be indicative of early reflections from specific directions. In particular, the inventors have found that the ground reflection typically used (when the binaural output is to be indicative only of sources in the horizontal plane of the listener's ears) can reduce the height sensation when the binaural output is to be indicative of overhead sources. To prevent this, the BRIR can be designed in accordance with some embodiments of the invention to replace each ground reflection with two overhead reflections at the same azimuth as the overhead source but at higher elevation. The early reflection emanating from the same azimuth and elevation as the sound source is retained in the overhead model, bringing the total number of early reflections for overhead sources to three. To support virtualization of object channels (as well as speaker channels), interpolated BRIRs may be used, where the interpolated BRIRs are generated by interpolating between a small set of predetermined BRIRs (generated in accordance with an embodiment of the invention) which are indicative of different ground and overhead early reflections as a function of source position.

In another class of embodiments, the invention is a method for generating a binaural signal in response to a set of N channels of a multi-channel audio input signal, where N is a positive integer (e.g., N=1, or N is greater than 1), said method including steps of:

(a) applying N (e.g., in the N subsystems 12, . . . , 14 of APU 10 of FIG. 4) binaural room impulse responses, $BRIR_1$, $BRIR_2$, . . . , $BRIR_N$, to the set of channels of the audio input signal, thereby generating filtered signals, including by applying the "i"th one of the binaural room impulse responses, $BRIR_i$, to the "i"th channel of the set, for each value of index i in the range from 1 through N; and (b) combining the filtered signals (e.g., in elements 16 and 18 of APU 10 of FIG. 4) to generate the binaural signal, wherein each said $BRIR_i$, when convolved with the "i"th channel of the set, generates a binaural signal indicative of sound from a source having a direction, $x_i$, and a distance, $d_i$, relative to an intended listener, and each said $BRIR_i$ has been designed by a method including steps of:

(c) generating candidate binaural room impulse responses (candidate BRIRs) in accordance with a simulation model (e.g., the model implemented by subsystem 101 of the FIG. 5 implementation of BRIR generator 31 of FIG. 4) which simulates a response of an audio source, having a candidate BRIR direction and a candidate BRIR distance relative to an intended listener, where the candidate BRIR direction is at least substantially equal to the direction, $x_i$, and the candidate BRIR distance is at least substantially equal to the distance, $d_i$;

(d) generating performance metrics (e.g., in subsystem 107 of the FIG. 5 implementation of BRIR generator 31 of FIG. 4), including a performance metric for each of the candidate BRIRs, by processing the candidate BRIRs in accordance with at least one objective function; and (e) identifying (e.g., in subsystem 107 of the FIG. 5 implementation of BRIR generator 31 of FIG. 4) one of the performance metrics having an extremum value, and identifying (e.g., in subsystem 107 of the FIG. 5 implementation of BRIR generator 31), as the $BRIR_i$, one of the candidate BRIRs for which the performance metric has said extremum value.

There are many embodiments of a headphone virtualizer which applies BRIRs which have been generated in accordance with an embodiment of the invention. Each virtualizer is configured to generate a 2-channel, binaural output signal in response to an M-channel audio input signal (and so typically includes one or more down-mixing stages each implementing a down-mixing matrix) and also to apply a BRIR to each channel of the audio input signal which is downmixed to 2 output channels. For performing virtualization on speaker channels (indicative of content corresponding to loudspeakers in fixed positions), one such virtualizer applies a BRIR to each speaker channel (so that the binaural output is indicative of content for a virtual loudspeaker corresponding to the speaker channel), each such BRIR having been predetermined offline. At runtime, each channel of the multi-channel input signal is convolved with its associated BRIR and the results of the convolution operations are then downmixed into the 2-channel binaural output signal. The BRIRs are typically pre-scaled such that downmix coefficients equal to 1 can be used. Alternatively, to achieve a similar result with lower computational complexity, each input channel is convolved with a "direct and early reflection" portion of a single-channel BRIR, a downmix of the input channels is convolved with a late reverberation portion of a downmix BRIR (e.g., a late reverberation portion of one of the single-channel BRIRs), and the results of the convolution operations are then downmixed into the 2-channel binaural output signal.

For rendering object channels of a multi-channel object-based audio input signal (each of which object channels may be indicative of content associated with a fixed or moving audio object), any of multiple approaches are possible. For example, in some embodiments each object channel of the multi-channel input signal is convolved with an associated BRIR (which has been predetermined, offline, in accordance with an embodiment of the invention) and the results of the convolution operations are then downmixed into the 2-channel binaural output signal. Alternatively, to achieve a similar result with lower computational complexity, each object channel is convolved with a "direct and early reflection" portion of a single-channel BRIR, a downmix of the object channels is convolved with a late reverberation portion of a downmix BRIR (e.g., a late reverberation portion of one of the single-channel BRIRs), and the results of the convolution operations are then downmixed into the 2-channel binaural output signal.

Regardless of whether the input signal channels undergoing virtualization are speaker channels or object channels, the most straightforward virtualization approach is typically to implement the virtualizer to generate its binaural output to be indicative of the outputs of a sufficient number of virtual speakers to allow smooth panning in 3D space of each sound source indicated by the binaural's content between the locations of the virtual speakers. In our experience, a binaural signal indicative of output from seven virtual speakers in the horizontal plane of the assumed listener's ears is typically sufficient for good panning performance, and the binaural signal may also be indicative of output of a small number of overhead virtual speakers (e.g., four overhead virtual speakers) in virtual positions above the horizontal plane of the assumed listener's ears. With four such overhead virtual speakers and seven other virtual speakers, the binaural signal would be indicative of a total of 11 virtual speakers.

The inventors have found that properly-designed BRIRs indicative of reflections optimized for one virtual source direction and distance can often be used for virtual sources in other positions in the same virtual environment (e.g., virtual room) with minimal loss of performance. In case of exceptions to this rule, BRIRs indicative of optimized reflections for each of a small number of different virtual source locations can be generated, and interpolation between them can be performed (e.g., in a virtualizer) as a function of sound source position, to generate a different interpolated BRIR for each needed virtual source location.

In some embodiments, the method generates a BRIR so as to maximize sound source externalization for the center channel (of a 5.1 or 7.1 channel audio input signal to be virtualized) under the constraint of neutral timbre. The center channel is widely regarded as the most difficult to virtualize since the number of perceptual cues are reduced (no ITD/ILD, where ITD is interaural time difference, or difference in arrival times between the two ears, and ILD is interaural level difference), visual cues are not always present to assist the localization, and so on. It is contemplated that various embodiments of the invention generate BRIRs useful for virtualizing input signals having any of many different formats, e.g., input signals having 2.0, 5.1, 7.1, 7.1.2, or 7.1.4 speaker channel formats (where "7.1.x" format denotes 7 channels for speakers in the horizontal plane of the listener's ears, 4 channels for speakers in a square pattern overhead, and one Lfe channel).

Typical embodiments do not assume that the input signal channels are speaker channels or object channels (i.e., they could be either). In choosing optimal BRIRs for virtualizing a multi-channel input signal whose channels consist of speaker channels only, an optimal BRIR for each speaker channel may be chosen (each of which, in turn, assumes a specific source direction relative to a listener). If the input signal to the virtualizer is expected to be an object-based audio program indicative of one or more sources, each panned through a wide range of positions, the binaural output signal would typically be indicative of more virtual speaker locations than would the binaural output signal in the case that the input signal comprises only a small number of speaker channels (and no object channels), and thus more BRIRs would need to be determined (each for a different virtual speaker position) and applied to virtualize the object-based audio program than the speaker-channel input signal. In operation to virtualize a typical object-based audio program, it is contemplated that some embodiments of the inventive virtualizer would interpolate between predetermined BRIRs (each for one of a small number of virtual speaker positions) to generate interpolated BRIRs (each for one of a large number of virtual speaker positions), and apply the interpolated BRIRs to generate the binaural output to be indicative of a pan over a wide range of source positions.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for generating an output binaural signal in response to an encoded audio program, the method comprising:

decoding the encoded audio program to provide N decoded audio signals, wherein each of the N decoded audio signals corresponds to a spatial location;

determining N direct response and early reflection binaural room impulse response, BRIR, portions, wherein each direct response and early reflection BRIR portion corresponds to the spatial location of one of the decoded audio signals;

determining a late response BRIR portion, wherein a subset of the late response BRIR portion temporally overlaps with subsets of the direct response and early reflection BRIR portions, and wherein the temporally overlapping subset of the late response BRIR portion models the transition from the direct response and early reflection BRIR portions to the late response BRIR portion;

generating, for each decoded audio signal, a binaural signal, by processing the decoded audio signal to apply the corresponding direct response and early reflection BRIR portion;

generating a first binaural signal by combining the binaural signals for each decoded audio signal;

generating a second binaural signal by processing a downmix of the N decoded audio signals to apply the late response BRIR portion; and generating the output binaural signal by combining the first binaural signal and the second binaural signal.

2. A non-transitory computer readable storage medium comprising a sequence of instructions, wherein, when an audio signal processing device executes the sequence of instructions, the audio signal processing device performs the method of claim 1.

3. An audio signal processing device for generating an output binaural signal in response to an encoded audio program, wherein the audio signal processing device comprises one or more processing components configured to:

decode the encoded audio program to provide N decoded audio signals, wherein each of the N decoded audio signals corresponds to a spatial location;

determine N direct response and early reflection binaural room impulse response, BRIR, portions, wherein each direct response and early reflection BRIR portion corresponds to the spatial location of one of the decoded audio signals;

determine a late response BRIR portion, wherein a subset of the late response BRIR portion temporally overlaps with subsets of the direct response and early reflection BRIR portions, and wherein the temporally overlapping subset of the late response BRIR portion models the transition from the direct response and early reflection BRIR portions to the late response BRIR portion;

generate, for each decoded audio signal, a binaural signal, by processing the decoded audio signal to apply the corresponding direct response and early reflection BRIR portion;

generate a first binaural signal by combining the binaural signals for each decoded audio signal;

generate a second binaural signal by processing a downmix of the N decoded audio signals to apply the late response BRIR portion; and generate the output binaural signal by combining the first binaural signal and the second binaural signal.

* * * * *